United States Patent [19]

Bruml et al.

[11] Patent Number: 4,727,253
[45] Date of Patent: Feb. 23, 1988

[54] TLD CARD READER

[75] Inventors: William Bruml, Cleveland Heights; Eric Newberry, Shaker Heights; Erwin F. Shrader, East Cleveland, all of Ohio

[73] Assignee: Harshaw/Filtrol Partnership, Cleveland, Ohio

[21] Appl. No.: 721,334

[22] Filed: Apr. 9, 1985

[51] Int. Cl.4 .............................................. G01T 1/115
[52] U.S. Cl. ..................................... 250/337; 250/328
[58] Field of Search .................. 250/328, 337, 361 R, 250/358.1, 359.1; 411/223, 225

[56] References Cited

U.S. PATENT DOCUMENTS

| | | | |
|---|---|---|---|
| 3,348,418 | 10/1967 | Utting et al. | 250/328 |
| 3,614,429 | 10/1971 | Perry | 250/337 |
| 3,725,659 | 4/1973 | Culley | 250/337 |
| 3,792,277 | 2/1974 | Yamashita et al. | 250/337 |
| 3,809,901 | 5/1974 | Szalanczy et al. | 250/337 |
| 4,303,857 | 12/1981 | Inoue et al. | 250/337 |

FOREIGN PATENT DOCUMENTS

| | | | |
|---|---|---|---|
| 1269736 | 7/1961 | France | 250/328 |
| 0001576 | 1/1980 | Japan | 250/337 |

OTHER PUBLICATIONS

Brochure entitled PANASONIC "New TLD TL Badge System", TL Badge Model UD-800A Series.
Brochure entitled PANASONIC "New TLD TL Badge System", TL Badge: Model UD-800 Series.
Brochure entitled PANASONIC "New TLD Access Control System".
Brochure entitled "Harshaw TLD System", Aug., 1982.
Brochure entitled "Model 2271 Automated TLD System".
Brochure entitled "AUTOLEDO Automatic TLD Reader".
Catalog, Pitman Products; Complete Short-Form Catalogue of Equipment.

*Primary Examiner*—Janice A. Howell
*Assistant Examiner*—David P. Porta
*Attorney, Agent, or Firm*—Renner, Otto, Boisselle & Lyon

[57] ABSTRACT

A TLD card reader comprising infeed and outfeed carousels for sequentially indexing cartridge holders for stacks of TLD cards to infeed and outfeed stations, and a shuttle transport for sequentially transferring TLD cards from the infeed station to a card read station and then to the outfeed station. At the read station plural photomultiplier tubes are mounted in opposition to respective hot fingers which are independently adjustable along three axes as well as independently biased for engagement with respective TL elements in a TLD card. For photomultiplier tube calibration a shuttle assembly is operable to move reference lights into the path of the shuttle transport for alignment with respective photomultiplier tubes. A light seal of star-like cross-section also is provided to seal the shuttle passageway at the read station. Also disclosed is a TLD card reader that does not require removal of the cards from their holders and which comprises a holder transport for successively transferring holders from an infeed to an outfeed station and a TLD card transport including flexible tongues for transferring a card from a holder to a read station and then back to the holder.

31 Claims, 30 Drawing Figures

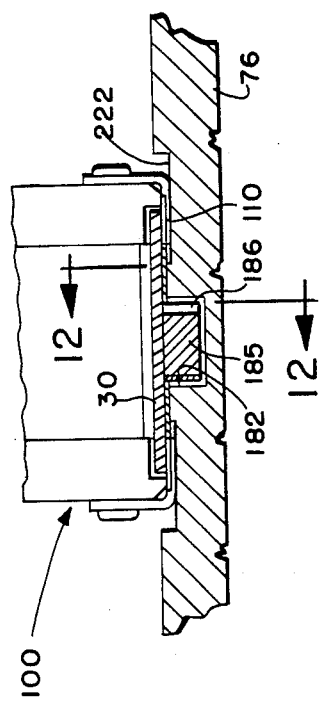
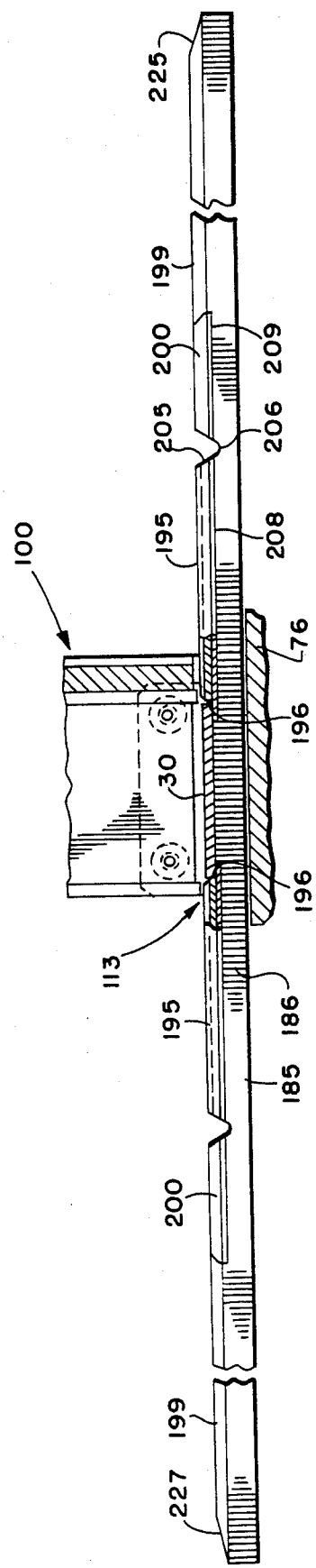

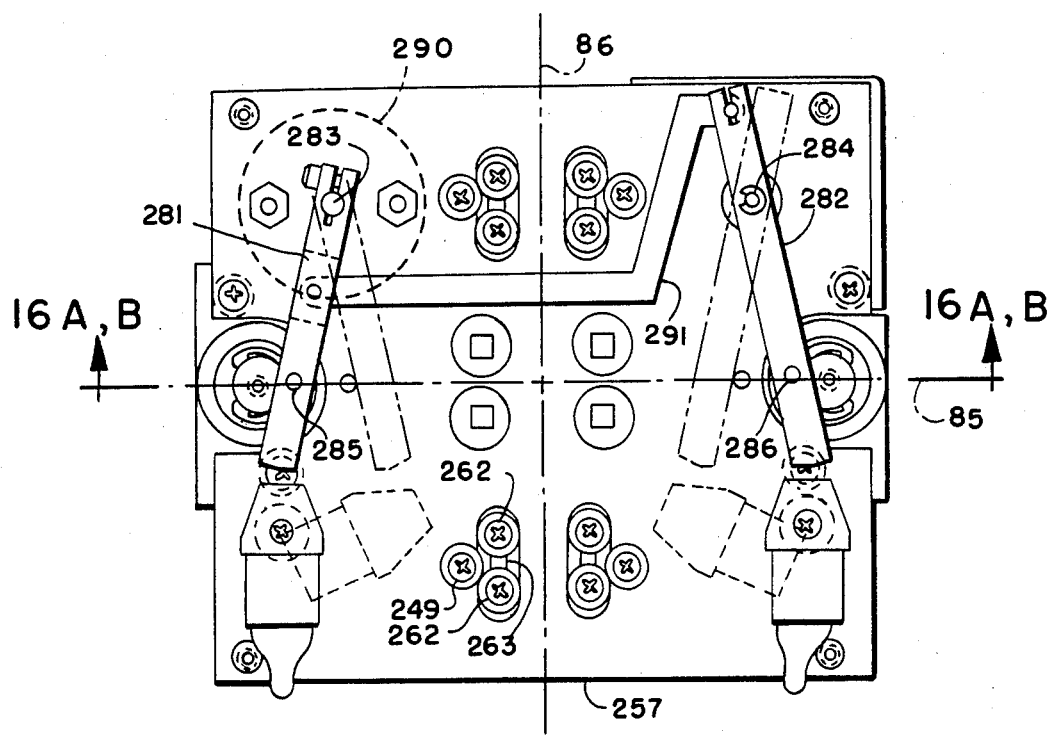
FIG. 15
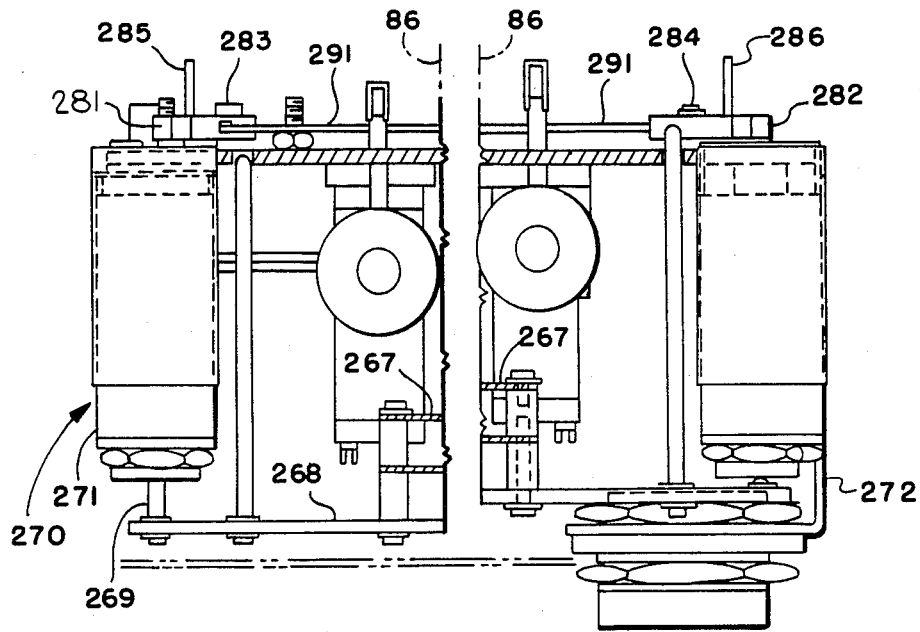
FIG. 16A
FIG. 16B

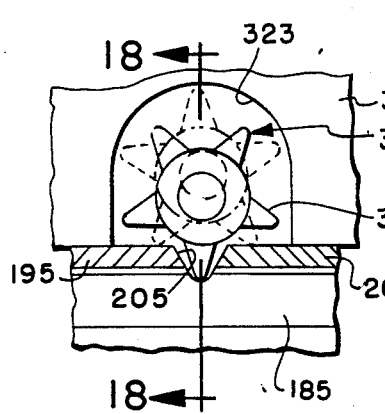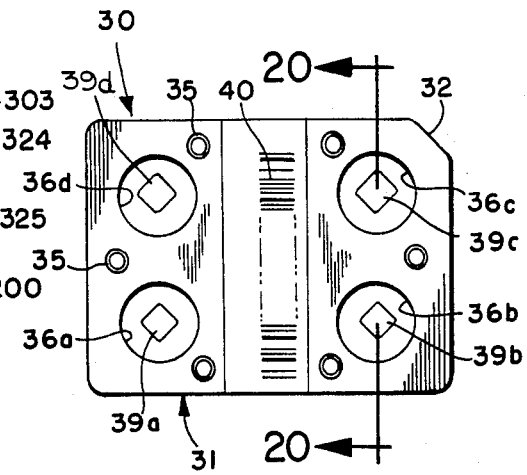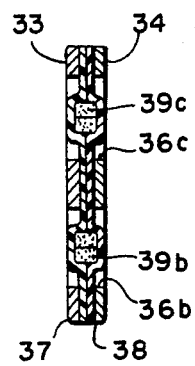
FIG.17  FIG.25  FIG.26
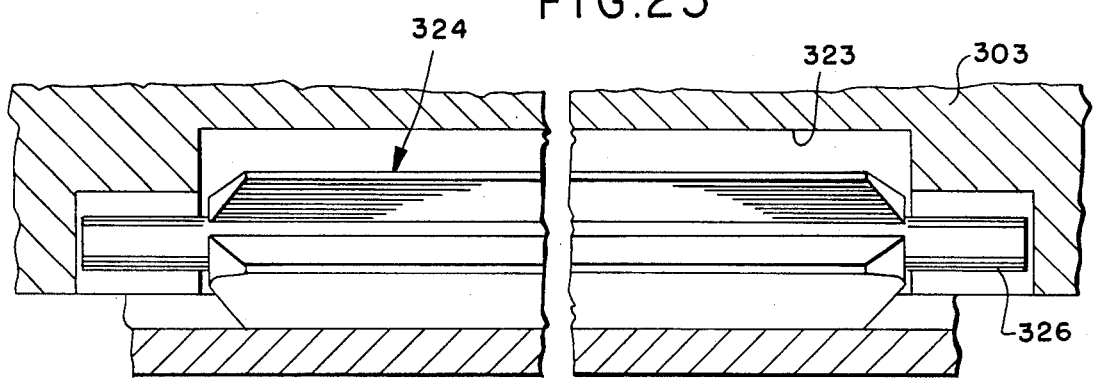
FIG.18
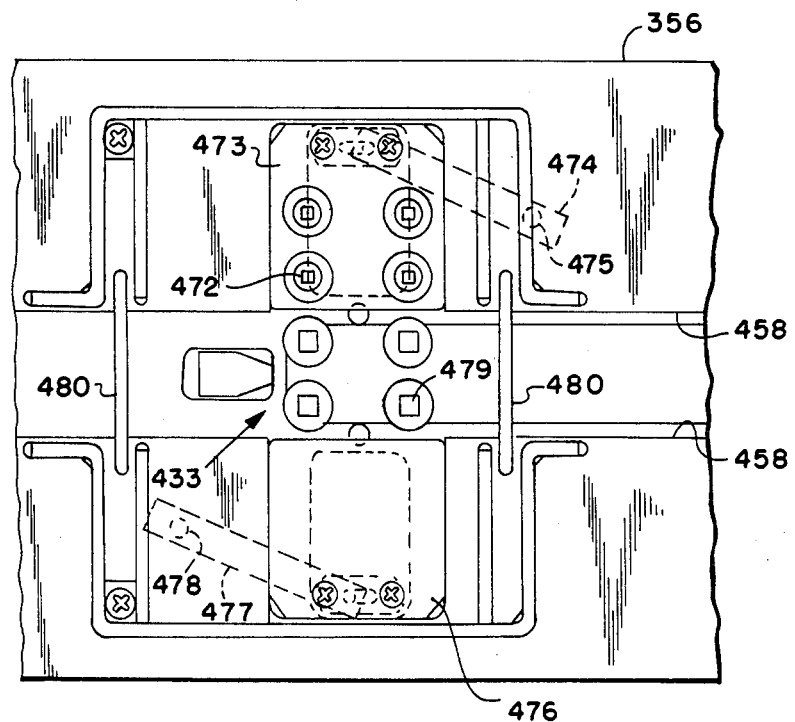
FIG.24

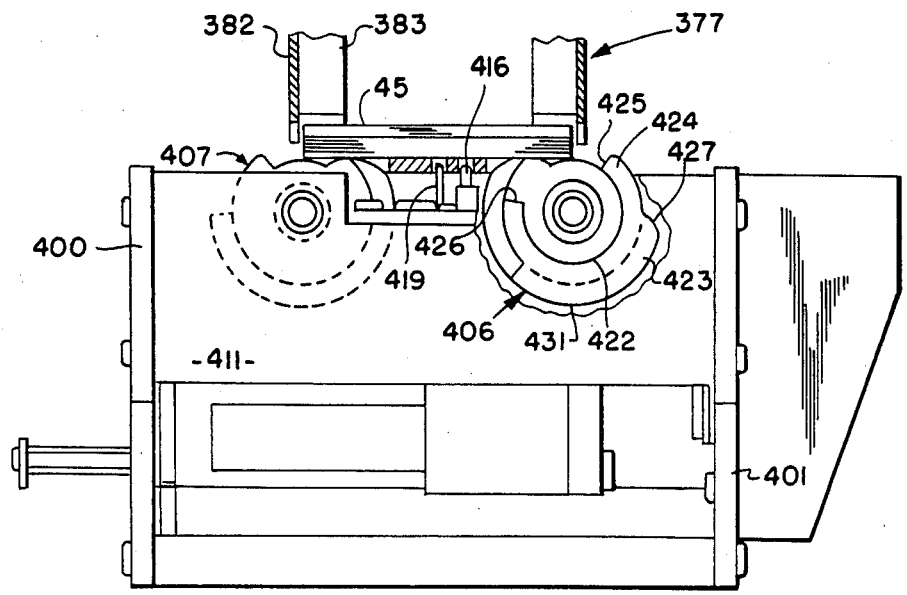
FIG. 22
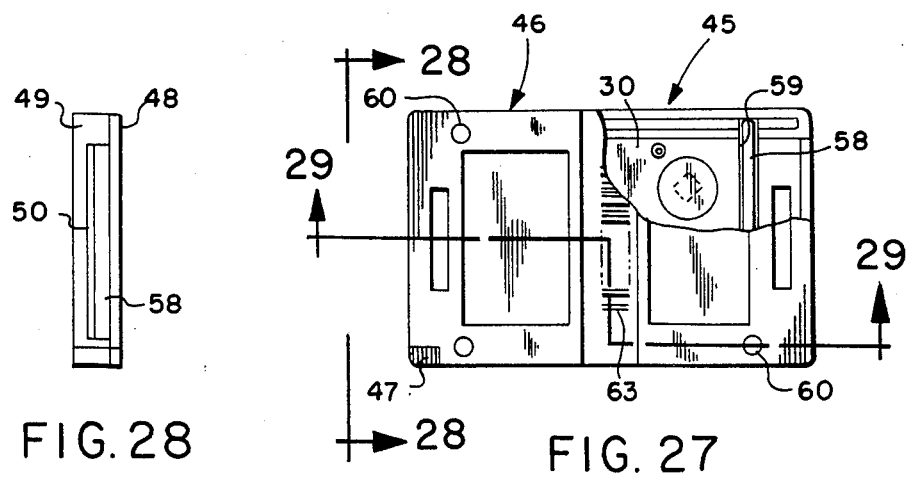
FIG. 28
FIG. 27
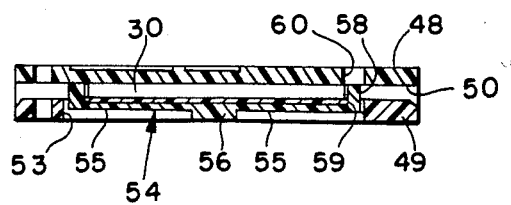
FIG. 29

TLD CARD READER

The invention herein disclosed relates generally to automatic thermoluminescence dosimetry card readers.

BACKGROUND

Thermoluminescence dosimetry, commonly referred to as TLD, is a technique for radiation dose measurement. Thermoluminescence is an emission of light which occurs when thermoluminescent phosphors are heated after having been exposed to beta, gamma, X-ray or neutron radiation. TLD has several known advantages over other dosimetry techniques such as film dosimetry.

TLD systems have been developed for monitoring personnel who work in the vicinity of radiation materials, X-ray equipment, etc. In such systems, each person being monitored is given a badge to wear that consequently will be exposed to the same dosage of radiation as the person wearing the badge. Although different types of badges have been used, generally the badges consist of an outer holder which houses a TLD card insert usually containing two, three or four thermoluminescent (TL) elements in crystal form. The TLD cards and the holders as well may be provided with a machine readable code to enable card and/or holder identification.

Periodically the TLD cards are processed through a TLD card reader to obtain an exposure record for each person being monitored. In the TLD card reader, the TL elements in each card are heated and the thermoluminescence is measured as by using a photomultiplier tube and associated electronic analysis circuitry to provide a read-out of the TL integrals and/or glow curve. Some TLD card readers require manual loading of each TL card whereas others include card transport assemblies for automatic processing of a batch of TLD cards that have been removed from their holders. Also known is a TLD card reader which can process the TLD cards without having to remove them from their holders. As is known, TLD cards or holders with the TLD cards may be loaded into one or more cartridges or magazines depending on the particular type of reader being employed.

SUMMARY OF THE INVENTION

Automatic TLD card readers according to the subject invention have a number of advantages and benefits including high card throughput, high batch processing capacity, high durability and long life span. In one TLD card reader embodiment, TLD cards which have been removed from their holders are automatically processed. In another TLD card reader embodiment, the holders with the TLD cards therein are loaded into the reader for automatic processing.

According to one aspect of the invention, a TLD card reader comprises a first holder for holding a plurality of TLD cards in vertically stacked relationship at an infeed station, a second holder for holding a plurality of TLD cards in vertically stacked relationship at an outfeed station, and a TLD card transport for sequentially transferring the TLD cards from the bottom of the first holder to the read station and then to the second holder for stacking therein. The transport includes a shuttle having a slot at its top side for receiving a TLD card and a drive for horizontally shifting the shuttle first to position the slot at the infeed station, then at the read station and then at the outfeed station.

According to another aspect of the invention, a TLD card reader comprises infeed and outfeed carousels operable sequentially to index cartridge holders containing a stack of TLD cards to infeed and outfeed stations, respectively, and a shuttle transport for sequentially transferring TLD cards from the infeed station to the outfeed station. The shuttle transport includes a shuttle having a card slot at its top surface for receiving a TLD card and a shuttle drive for longitudinally shifting the shuttle first to position the card slot at the infeed station, then at the read station and then at the outfeed station. Each cartridge holder includes a transversely extending slot at its lower end allowing edgewise removal or insertion of a TLD card received in the card slot of the shuttle upon longitudinal movement of the shuttle.

Further in accordance with the invention, the infeed and outfeed carousels each include a carousel rack for holding a plurality of cartridge holders in a circumferentially spaced apart arrangement while permitting vertical movement of such holders in the cartridge rack. Each carousel assembly also includes a drive mechanism for rotatably indexing the carousel rack sequentially to locate the cartridge holders at the transfer (infeed or outfeed) station. The cartridge holders are vertically supported at elevated positions in the cartridge rack by an annular track surface which terminates adjacent the transfer station to permit lowering of a cartridge holder at the transfer station. Also provided is a cam mechanism for raising a cartridge holder at the transfer station to an elevated position prior to indexing of the carousel rack for transfer of the raised cartridge holder onto the annular retainer during subsequent indexing rotation of the carousel rack.

Further in accordance with the invention, an enclosure for the read station of the TLD card reader has a passageway through which the transport shuttle moves for transfer of a TLD card to and from the read station. At each end of the passageway the top surface of the shuttle is sealed by a transversely extending light seal including plural radiating splines which are circumferentially arranged about the transverse axis of the light seal and extend the width of the shuttle. The light seal normally rides at the vertices to two splines on the top surface of the shuttle but is rotatable about its axis to permit one spline to drop into a transverse slot at the top surface of the shuttle to seal against passage of light along the top surface of the shuttle.

According to still another aspect of the invention, a TLD card reader into which holders with TLD cards are loaded comprises infeed and outfeed holders for holding vertical stacks of card holders with TLD cards respectively at infeed and outfeed stations, a card holder transport for successively transferring card holders from the infeed station to a card removal station and then to the outfeed station along a straight card holder path extending between the infeed and outfeed stations, and a TLD card transport for transferring the TLD card of each holder successively presented to the card removal station to a TLD card read station at one side of the card holder path and then back to the card removal station for replacement in the holder. The TLD card transport includes a pair of oppositely disposed flexible tongues and associated drives.

According to a further aspect of the invention, there is provided in a TLD card reader a TLD card transport for transferring a TLD card edgewise along a narrow planar path to and from a read station in the reader, a heater at the read station at one side of the path for heating a TL element of a TLD card positioned at the read station by the transport, a sensor at the other side of the path in opposition to the heater for sensing light emitted by the TL element when heated by the heater, a shutter movable into the plane of the path from a first position transversely offset from the path to a second position between the heater and sensor, and a reference light carried by the shutter for effecting calibration, testing or the like of the sensor when the shutter is located at such second position.

The invention also provides a hot finger assembly for a TLD card reader comprising plural hot fingers, means for mounting the hot fingers for extension and retraction, means for yieldingly urging each hot finger to an extended position independently of the other hot fingers, and means for commonly retracting the hot fingers from their respective extended positions.

Also, the hot fingers are mounted to a common support plate for universal adjustment independently of the other hot fingers.

The foregoing and other features of the invention hereinafter are more fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 3 is a vertical/transverse section through the TLD card transport and reader mechanism of FIG. 1 taken substantially along the line 3—3 of FIG. 2;

FIG. 11 is an enlarged fragmentary vertical/transverse section through the mechanism of FIG. 1 taken substantially along the line 11—11 of FIG. 2 but with the transport assembly thereof shifted to its infeed position;

FIG. 12 is a fragmentary vertical/longitudinal section taken substantially along the line 12—12 of FIG. 11;

FIG. 15 is a top plan view of the hot finger and reference light assembly of FIG. 13;

FIGS. 16A and 16B are broken continuations of a section through the hot finger and reference light assembly of FIG. 13 taken substantially along the line 16A,B of FIG. 15 and respectively showing the hot fingers of such assembly in retracted and extended positions;

FIG. 17 is an enlarged fragmentary vertical/longitudinal section of the mechanism of FIG. 1 taken substantially along the line 17—17 of FIG. 2;

FIG. 18 is a fragmentary vertical/transverse section taken substantially along the line 18—18 of FIG. 17;

FIG. 22 is an end elevational view, partly broken away and looking generally in the direction of the arrows 22—22 of FIG. 21;

FIG. 24 is a fragmentary horizontal section taken substantially along the line 24—24 of FIG. 23;

FIG. 25 is a top plan view of an exemplary TLD card;

FIG. 26 is a section through the TLD card of FIG. 25 taken substantially along the line 26—26 thereof;

FIG. 27 is a top plan view, partly broken away, of an exemplary TLD card holder;

FIG. 28 is an end elevational view of the card holder of FIG. 26 looking generally in the direction of the arrows 28—28 of FIG. 27; and FIG. 29 is a section through the card holder of FIG. 27 taken substantially along the line 29—29 of FIG. 27.

DETAILED DESCRIPTION

Figure 1:
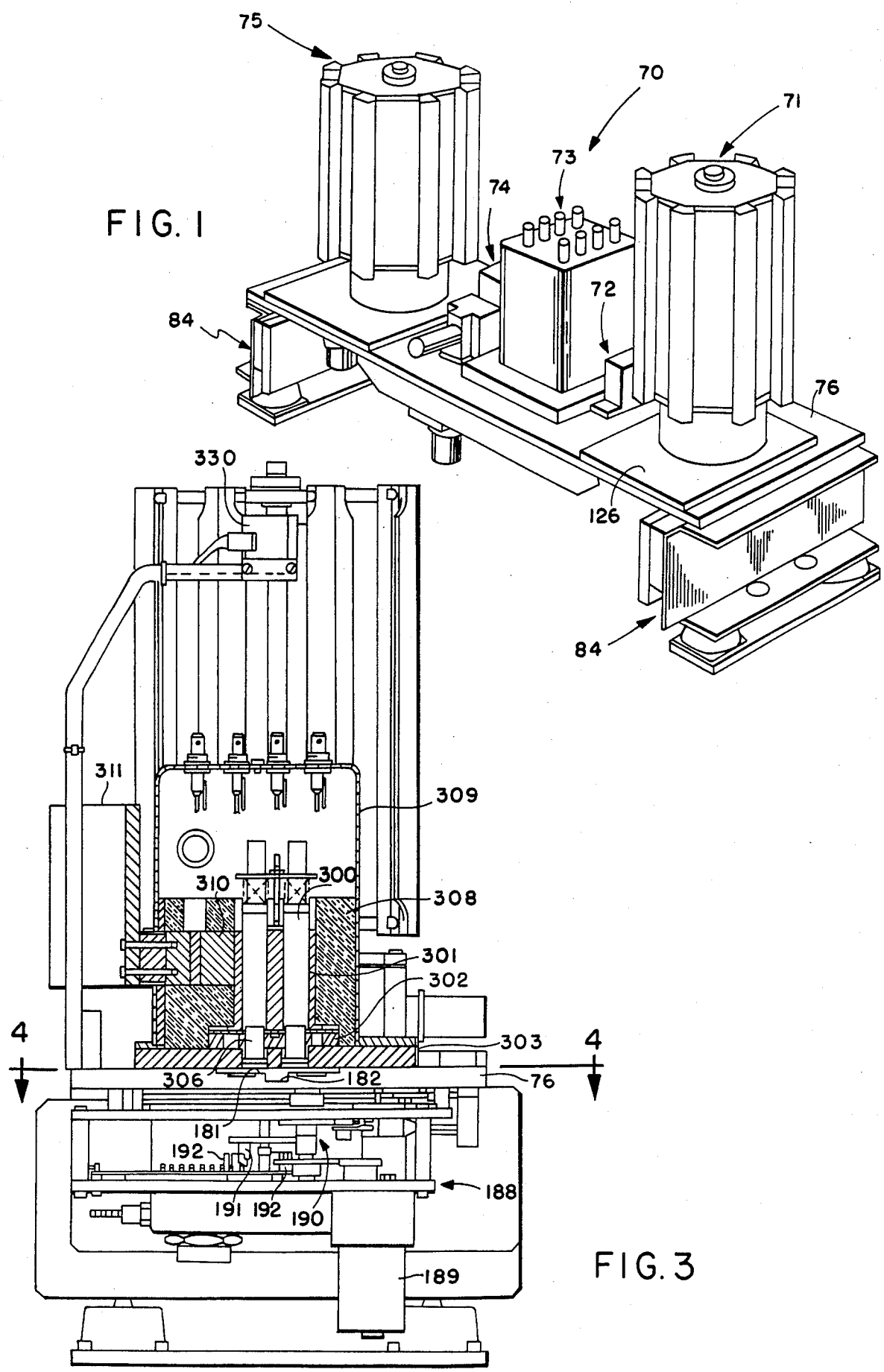
FIG. 1 is a perspective view of a TLD card transport and reader mechanism having application in a TLD card reader according to the subject invention.

Referring now in detail to the drawings, FIGS. 1–18 relate to an automatic TLD card reader into which only TLD cards are loaded, and FIGS. 19–24 relate to an automatic TLD card reader into which the holders with the TLD cards are loaded. An exemplary TLD card usable with both readers is shown in FIGS. 25 and 26, and an exemplary holder is shown in FIGS. 27–29. To facilitate a description and understanding of the herein disclosed readers and components thereof, the exemplary TLD card and holder will first be described.

In FIGS. 25 and 26, the exemplary TLD card, indicated generally at 30, can be seen to include a thin substrate 31 of rectangular shape except for the provision of a beveled orientation identification corner 32. The substrate 31 consists of two aluminum plates 33 and 34 that are secured together by rivets 35. The plates 33 and 34 have aligned holes forming four windows 36a–d which are arranged in a rectangular pattern at respective quadrants defined by major and minor axes of the substrate. Sandwiched between the plates 33 and 34 are two sheets 37 and 38 of transparent heat resistant material such as transparent Teflon material that encapsules TL elements 39a-d at respective windows 36a-d. The TLD card also carries a machine readable code 40 extending along the minor axis of the card between the furthest spaced pairs of the windows.

The thermoluminescent materials of the TL elements 39a-d may be selected to suit a particular application such as detection of one or more different types of radiation. The number of TL elements may be varied for any given application and filters may be provided in known manner. If only two TL elements are required, typically they would be located on one side of the major or long axis of the TLD card and, as is known, a machine readable code having a BCD format may be provided on the other side of the card's long axis as an alternative to the illustrated bar code format.

In FIGS. 27-29, the exemplary holder, indicated generally at 45, can be seen to include a rectangular housing 46 having a notched orientation identification corner 47. The housing 46 includes top and bottom halves 48 and 49 which may be of plastic or plastic-like material. The halves 48 and 49 are joined along their side edges and form therebetween a slot 50 having a width and height slightly greater than the width and thickness of the TLD card (FIGS. 24 and 26), respectively. The slot 50 is open at both ends of the housing 46 for insertion or removal of the TLD card at either end of the housing.

The underside of the bottom half 49 is recessed at 53 to accommodate a flexible tongue plate 54. The tongue plate 54 has flap-like end portions 55 and a thicker central portion 56 secured to the bottom half of the housing. The end portions or flaps 55 accordingly are supported in cantilever-like fashion and are free to flex outwardly (downwardly) away from the bottom half.

Each flexible flap 55 has at its distal end a laterally extending bar-like tongue 58 which protrudes inwardly through a corresponding slot 59 in the bottom half 49 of the housing. In the unflexed condition of the flaps, the tongues 58 close off respective ends of the slot 50 for locking a TLD card therebetween and in the holder. Either flap, however, may be flexed outwardly such that the tongue 58 thereof clears the slot 50 to permit insertion or removal of the TLD card at the respective end of the housing 46. Such outward flexure of the flaps may be effected by inserting pins through holes 60 in the top half 48 of the housing. As shown, two holes 60 are aligned with respective ends of each tongue.

As seen in FIG. 27, the holder also may be provided with a machine readable code such as a bar code 63 for holder identification. The bar code preferably extends along the minor axis of the holder at its top surface.

The above described and related types of TLD cards and holders presently are being manufactured and sold by the Harshaw/Filtrol Partnership of Cleveland, Ohio. The TLD cards and holders do not by themselves form a part of the subject invention.

The TLD Card Reader of FIGS. 1-18

Figure 2:
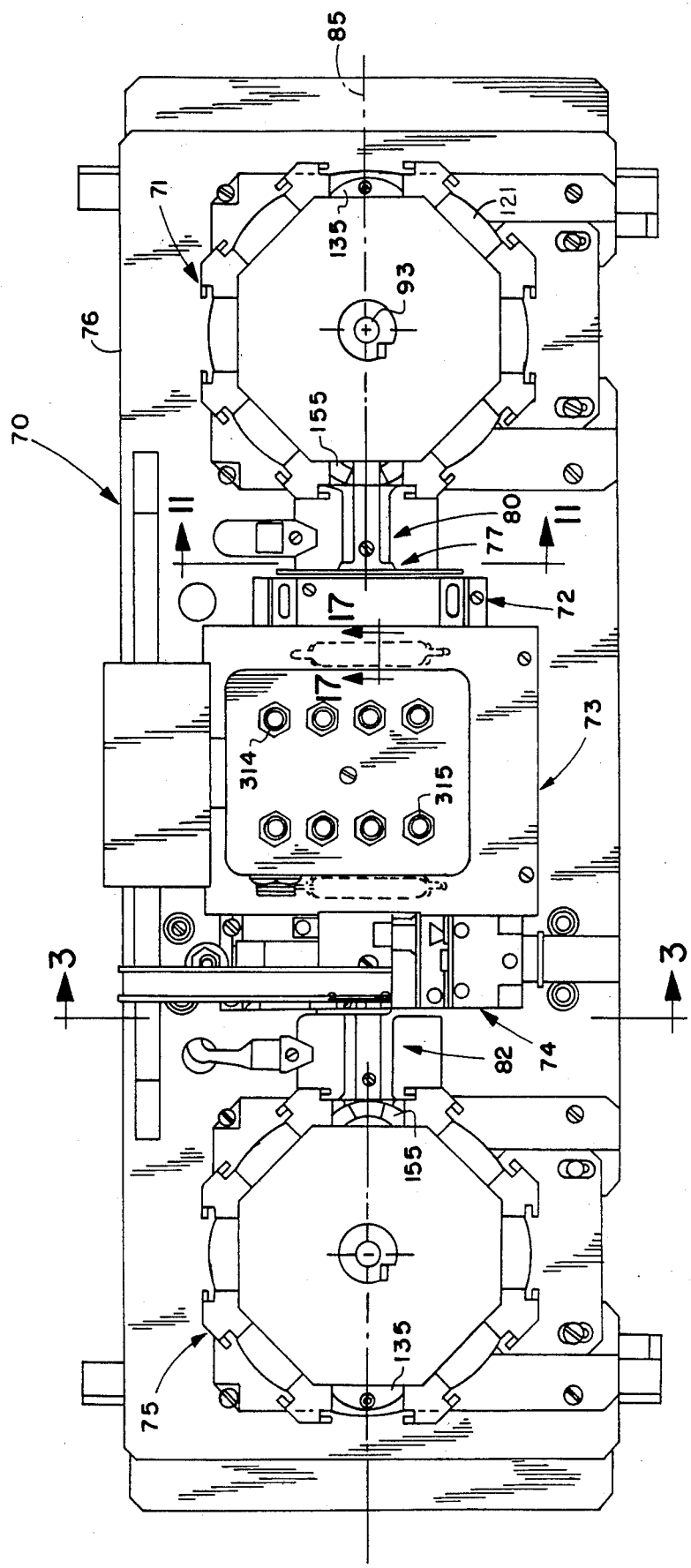
FIG. 2 is a top plan view of the card transport and reader mechanism of FIG. 1.

Referring now to FIGS. 1 and 2, a transport and reader mechanism for a TLD card reader according to the invention is designated generally by reference numeral 70. Going from right to left, the mechanism 70 generally comprises an infeed carousel assembly 71, a TLD card identification reader assembly 72, a photo-multiplier (PMT) assembly 73, an irradiation assembly 74 and an outfeed carousel assembly 75. These component assemblies are conveniently mounted to a main support plate 76 generally in line with a TLD card transport assembly 77 more fully shown in FIG. 4.

The transport assembly 77 operates to transfer TLD cards from an infeed station 80 past the card identification reader assembly 72 to a read station 81 beneath the PMT assembly 73, and then from the read station 81 past the irradiation assembly 74 to an outfeed station 82. At the read station 81, there additionally is provided a hot finger and reference light assembly indicated generally at 83 in FIG. 4 and more fully shown in FIGS. 11-13. The mechanism 70 may be housed in a cabinet along with associated electronics and controls, and the main support plate 76 may be supported at its ends by leg assemblies 84 as seen in FIG. 1.

For purposes of spatially relating the various components of the transport and reader mechanism 70 which are shown in respective figures of the drawings, reference hereinafter will be made to the longitudinal center line of the mechanism 70. Such center line is indicated at 85 in FIGS. 2 and 4, and it is along such center line 85 which the infeed station 80, read station 81 and outfeed station 82 are located. Also, the transport assembly 77 extends along and its transversely centered to the center line 85. Unless otherwise indicated or apparent, reference to a longitudinal direction means a direction parallel to the center line 85 while reference to a transverse direction means a direction normal to the center line 85. Reference also will be made to the transverse center line of the read station 81 which is indicated at 86 in FIG. 4.

The Infeed and Outfeed Carousels (First Embodiment)

In the illustrated mechanism 70, the infeed carousel assembly 71 and the outfeed carousel assembly 75 are for the most part mirror images of one another. Accordingly, only the infeed carousel assembly 71 will be described in greater detail.

With reference to FIGS. 2, 3 and 5-7, the infeed carousel assembly 71 includes a carousel rack 88. The carousel rack includes horizontal top and bottom rack plates 89 and 90 which are secured by respective clamping hubs 91 and 92 to a vertical center shaft 93. The rack plates 89 and 90 have identical octagonal shapes and the facets or sides of each plate are coplanar with respective sides of the other plate.

Figure 5:
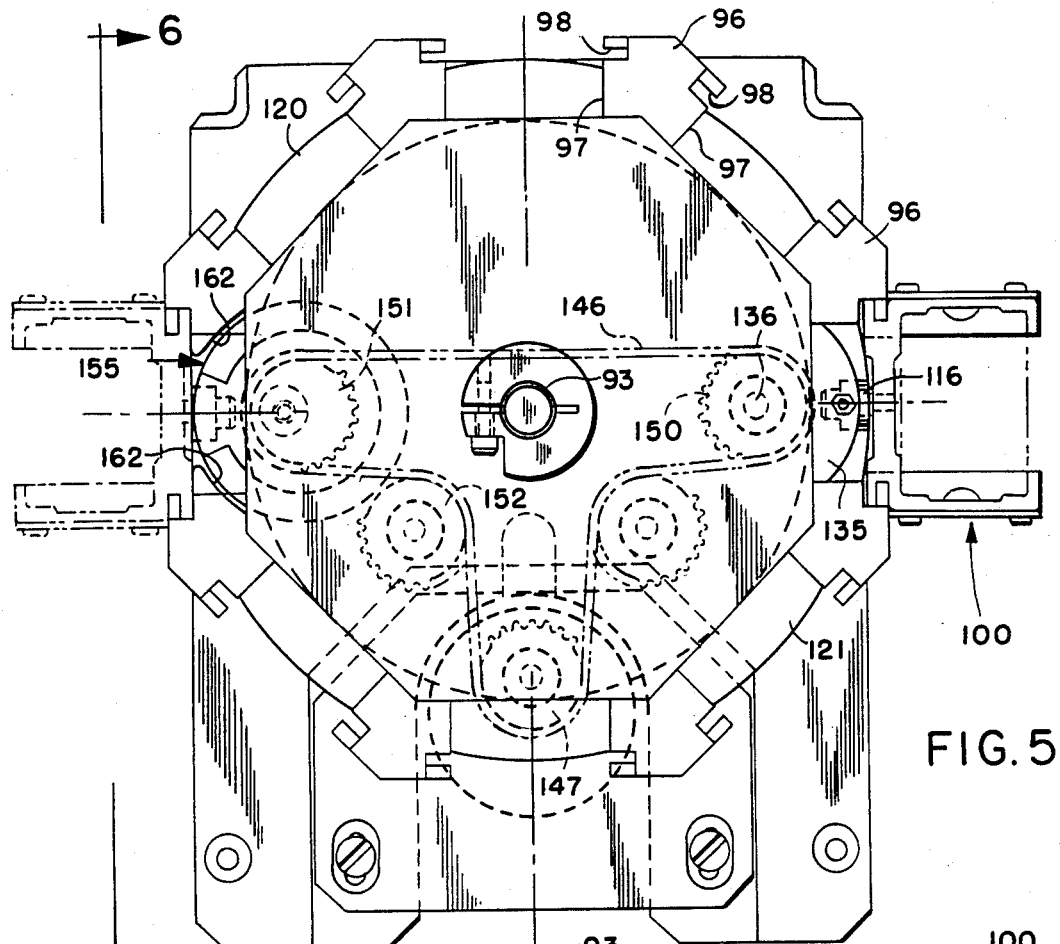
FIG. 5 is an enlarged top plan view of the righthand carousel assembly of the card transport and reader mechanism of FIG. 1.

Vertical cartridge rails 96 are secured top and bottom to the rack plates 89 and 90 at respective perimeter corners of such plates. Each relatively adjacent pair of cartridge rails 96 form therebetween a respective one of eight vertical rack positions for TLD card cartridges of the type shown in FIGS. 8-10. As seen in FIG. 5, the vertical side surfaces 97 of each rail are perpendicular to respective sides of the rack plates and are provided with respective vertical slots 98. The vertical slots 98 of each rail are opposite respective vertical slots of relatively adjacent rails.

Figure 8:
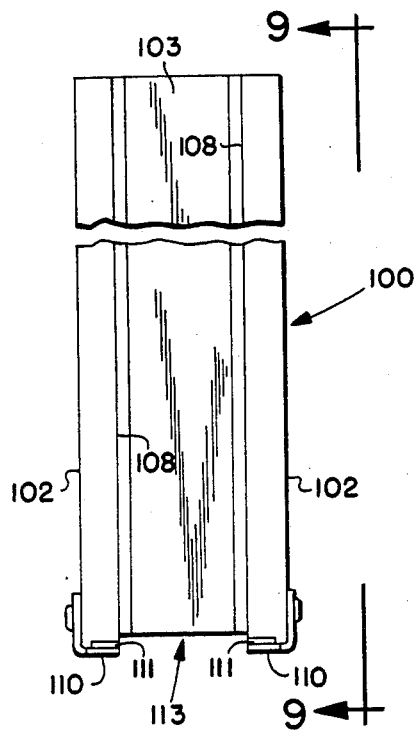
FIG. 8 is a front elevation of a cartridge holder having use in the card transport and reader mechanism of FIG. 1.
Figure 9:
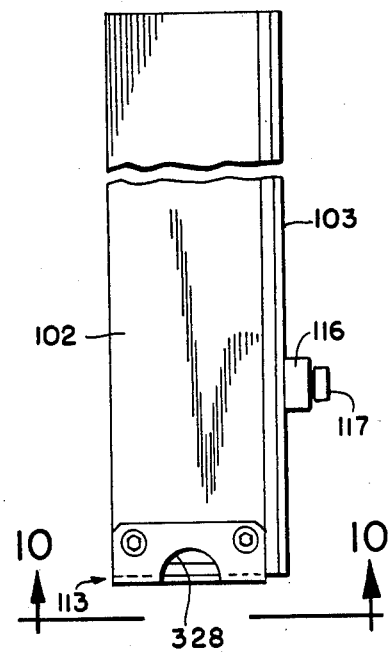
FIG. 9 is a side elevation of the cartridge holder of FIG. 8 looking generally in the direction of the arrows 9—9 thereof.
Figure 10:
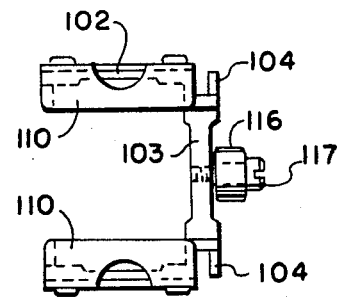
FIG. 10 is a bottom plan view of the cartridge holder of FIG. 8 looking generally in the direction of the arrows 10—10 of FIG. 9.

In FIGS. 8-10, a respresentative cartridge holder for a stack of TLD cards is indicated generally at 100. The cartridge holder 100 has a generally U-shape cross-section and will be oriented vertically as shown when loaded into the carousel rack 88. The cartridge holder has parallel side walls 102 which project forwardly from respective vertical sides of a back wall 103. The back wall 103 is provided with oppositely extending rail-like flanges 104 along respective vertical edges thereof for vertical sliding interfit in respective vertical slots 98 of relatively adjacent cartridge rails 96 of the carousel rack 88 as seen at the right in FIG. 5.

As will be appreciated, a cartridge holder 100 may be top loaded into the carousel rack 88 by first positioning the cartridge holder above a relatively adjacent pair of cartridge rails 96 and then vertically lowering the cartridge holder with the rail-like flanges 104 sliding in respective slots 98 of such cartridge rails. In similar manner, as many as eight cartridge holders may be loaded into the carousel rack at circumferentially equally spaced positions around the axis of the carousel center shaft 93. As seen at the right in FIG. 5, the side walls 102 of the cartridge holder will be located outwardly of the cartridge rails and will extend vertically as will the back wall 103.

At their vertical edges opposite the back wall 103, the side walls 102 are turned inwardly to form respective retainer lips 108 in a plane parallel to the back wall 103. The lips 108 are spaced from the back wall 103 by an amount slightly greater than the narrow dimension of a TLD card 30 (FIGS. 25 and 26) and the side walls 102 are spaced apart by an amount slightly greater than the long dimension of the TLD card. Accordingly, a plurality of TLD cards may be stacked one atop the other within the interior of the cartridge holder with their respective planes extending normal to the axial extent of the cartridge holder.

At the lower ends of the side walls 102, the cartridge holder 100 further includes respective feet 110 which extend horizontally inwardly beneath the interior of the cartridge holder to a point approximately flush with the inner edges of the respective retainer lips 108. As seen in FIGS. 9 and 10, the feet 110 preferably extend the full width of the side walls 102. When TLD cards are stacked in the cartridge holder, the lowermost card of the stack will be supported atop the feet.

As best seen in FIG. 8, each lip 108 has a notch 111 at its lower end adjacent the respective foot 110 to form with the notch in the other lip a transverse slot 113 at the bottom of the cartridge holder 100 through which the bottommost TLD card may be withdrawn edgewise from the cartridge holder. The transverse slot 113 defined by the notches 111 and the top surfaces of the feet has a height greater than the thickness of one TLD card but less than the combined thicknesses of two TLD cards so that only the lowermost TLD card in the cartridge holder can be withdrawn from the cartridge holder. Of course, the width of the slot 113 is greater than the long dimension of the TLD card for free edgewise passage of the TLD card through such slot.

The cartridge holder 100 also is provided with a cam roller 116 secured by a shoulder screw 117 to the back wall 103 for rotation about an axis normal to the planar extent of the back wall 103. As seen in FIG. 9, the cam roller protrudes to the rear of the back wall at a point spaced above the lower end of the cartridge holder.

Figure 7:
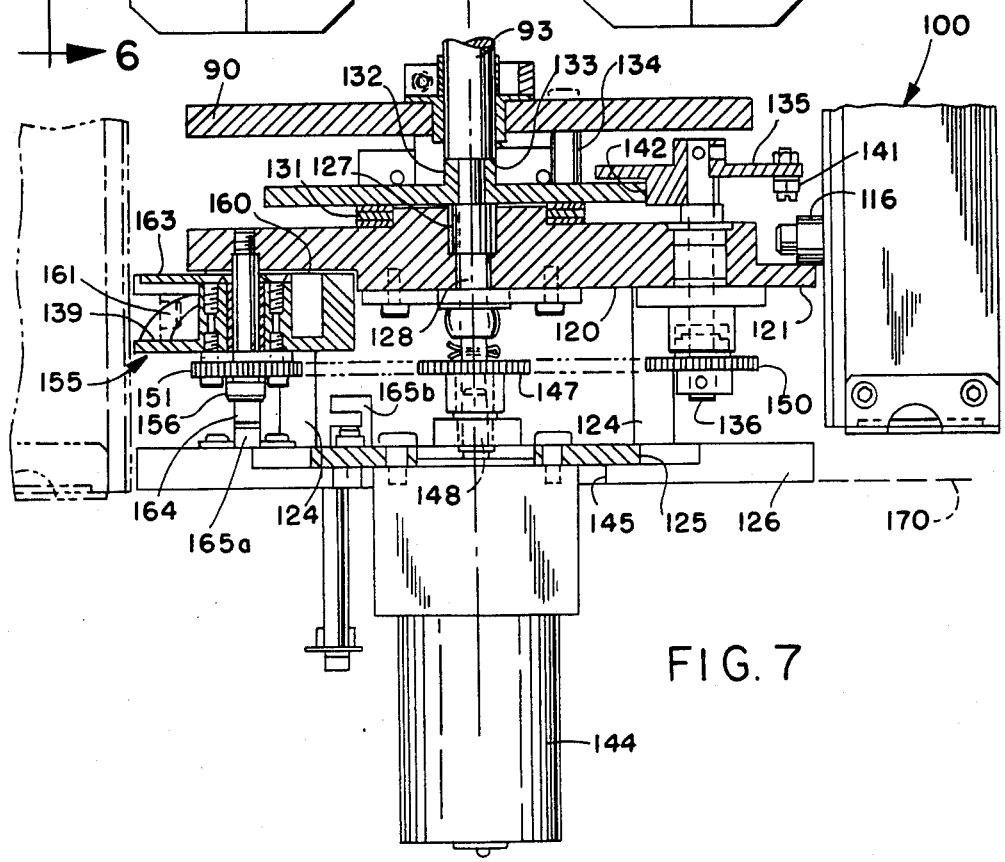
FIG. 7 is a vertical/longitudinal section through the carousel assembly of FIG. 5 taken substantially along the line 7—7 of FIG. 6.

When the cartridge holder 100 is loaded into the carousel rack 88, the cam roller 116 will ride on a horizontal circular track plate 120 as seen at the right in FIGS. 5 and 7. More particularly, the cam roller will ride on the top surface of an annular peripheral flange 121 of the track plate 120. In this manner, the cartridge holder will be vertically supported in the carousel rack.

The track plate 120 is secured atop spacers 124 which in turn are secured atop an adjustment plate 125 that is secured in a recess in a carousel assembly mounting plate 126. As seen in FIG. 1, the carousel assembly mounting plate 126 may be mounted atop the main support plate 76 of the card transport and reader mechanism 70. The track plate 120 has a center bore retaining a bearing 127 which rotatably supports the reduced diameter lower end 128 of the carousel center shaft 93 as seen in FIG. 7.

The track plate 120 also suports the driven wheel 130 of a Geneva mechanism by way of interposed thrust bearings 131. The driven wheel 130 is concentric with the carousel center shaft 93 and, at its hub 132, vertically supports the center shaft 93 at a shoulder 133 on the center shaft. The driven wheel also supports the bottom rack plate 90 by way of spacers 134 which additionally serve to couple the bottom rack plate to the driven wheel for common rotation about the axis of the center shaft. The spacers 134 also provide vertical clearance for the driver wheel 135 of the Geneva mechanism. The driver wheel 135 is fixed to a vertical shaft 136 which is journaled in the track plate 120.

In the illustrated carousel rack 88 wherein eight rack positions are located at 45° increments, the Geneva mechanism is of well known type which provides for intermittent 45° rotation of the driven wheel 130 upon 360° rotation of the driver wheel 135. The driven wheel accordingly has eight radially extending slots 139 and eight concave cam surfaces 140 between respective relatively adjacent slots 139. As is also conventional, the driver wheel 135 has a cam roller 141 for engaging the slots 139 to effect intermittent rotation of the driven wheel and a convex dwell cam surface 142 for engaging the concave cam surfaces 140 of the driven wheel for preventing rotation of the driven wheel when the cam roller 141 is not engaged in a slot 139. As is well known, the driven wheel of an eight point Geneva mechanism has a dwell period corresponding to 225° rotation of the driver wheel and a rotation period corresponding to 135° rotation of the driver wheel.

Rotation of the driver wheel 135 is effected by a motor 144 mounted to the underside of the adjustment plate 125 at a circular hole 145 in the carousel mounting plate 126. The motor 144 is drivingly coupled to the driver wheel 135 by a drive chain 146 which passes from a gear 147 mounted on the motor shaft 148 over an idler gear 149 to a gear 150 mounted to the driver wheel shaft 136. On its return path, the drive chain passes around a barrel cam gear 151, an idler gear 152 and then back to the gear 147 mounted to the motor shaft.

The barrel cam gear 151 is mounted to the underside of a barrel cam 155 which in turn is mounted by a shoulder screw 156 to and beneath the track plate 120 for rotation about a vertical axis. As best seen in FIG. 5, the barrel cam is located in diametric opposition to the driver wheel 135 of the Geneva mechanism.

Figure 6:
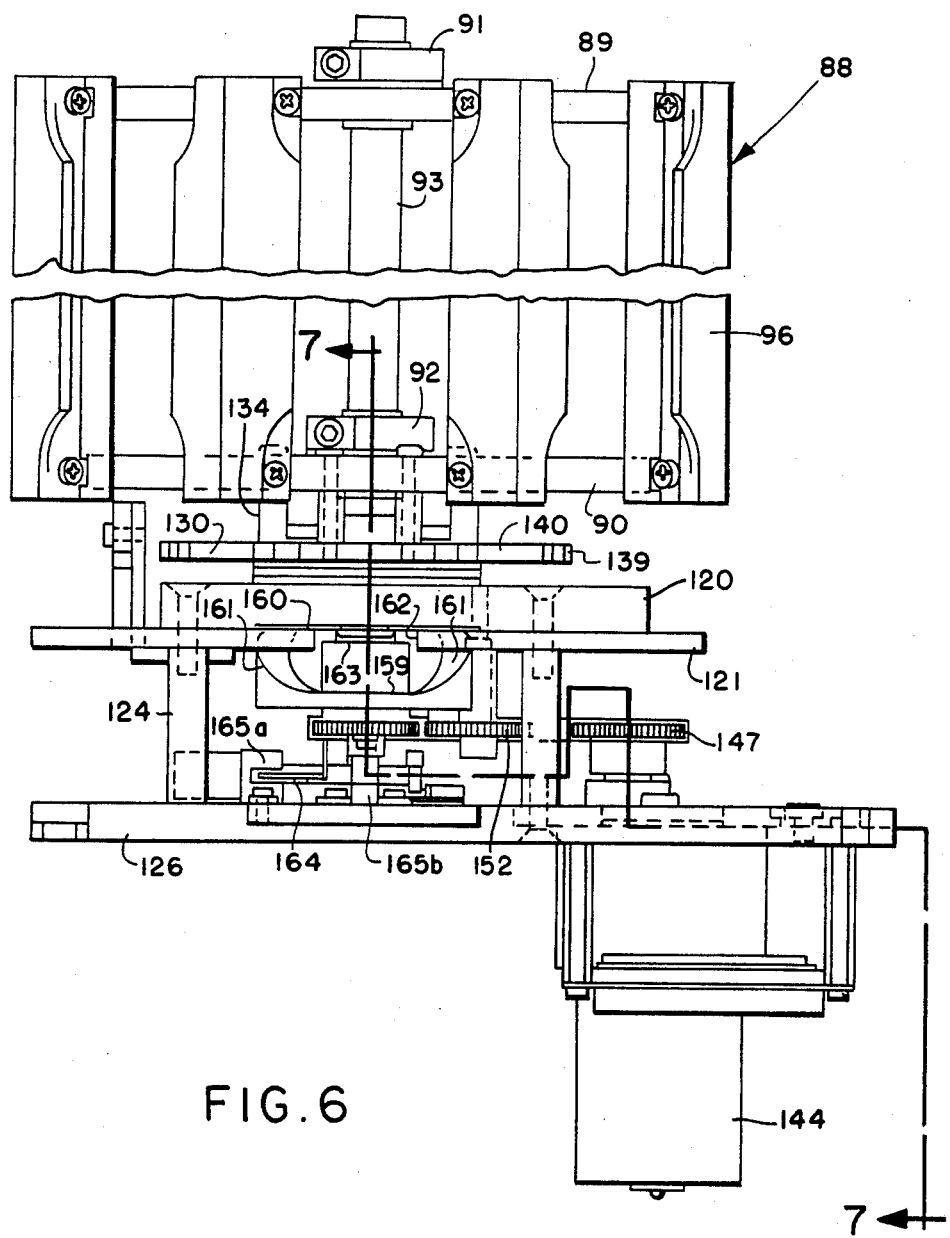
FIG. 6 is a vertical elevation of the carousel assembly of FIG. 5 looking generally in the direction of the arrows 6—6 thereof.

The barrel cam 155 has an upwardly facing, annular cam surface including a lower horizontal segment 159, an upper horizontal segment 160 diametrically opposite the lower segment 159, and transition segments 161 which gradually rise or descend between the upper and lower horizontal segments. As seen in FIGS. 6 and 7, the upper horizontal segment 160 is at the same elevation as the top surface of the track plate flange 121 which has a discontinuity conforming to the circular profile of the barrel cam as seen at 162 in FIG. 5. Also, the upper horizontal segment has an arcuate length of about 90° or twice the indexing increment of the carousel rack 88 corresponding to 360° rotation of the driver wheel 135 of the Geneva mechanism.

The barrel cam 155 also is provided with a retainer bar 163 mounted to the hub of the barrel cam at approximately the same elevation as the upper horizontal cam surface segment 160. The retainer bar projects radially from the hub above the lower horizontal cam surface segment 159 at a vertical spacing greater than the diameter of the cam roller 116 of the cartridge holder 100. Also provided is a sensor flag 164 which is mounted to the barrel cam for rotation therewith. The sensor flag extends downwardly and then radially outwardly for horizontal passage through a slot in position sensors 165a and 165b mounted atop the plate 125. The flag and sensor 165a serve to detect completion of 360° rotation of the barrel cam and also the driver wheel 135 during operation of the carousel assembly, and the flag and sensor 165b serve to detect 90° rotation of the barrel cam.

As seen in FIG. 2, the barrel cam 155 is located adjacent the infeed station 80 along the longitudinal center line 85 of the card transport and reader mechanism 70. As also seen in FIG. 2, the axis of the center shaft 93 intersects the center line 85.

In FIG. 2, the carousel assembly 71 is shown in an idle position as when the motor 144 is not being operated to rotate the barrel cam 155 and driver wheel 135 of the Geneva mechanism. In such idle position, the lower horizontal cam surface segment 159 of the barrel cam 155 will be positioned nearest the infeed station 80 at the center line 85, and the cam roller 141 of the driver wheel 135 will be at the outer point of the dwell segment of the Geneva mechanism. Also, the carousel rack 88 will be at a rotational position locating one of its cartridge rack positions adjacent and in line with the infeed station 80 and, if a cartridge holder 100 has been loaded into the carousel at such rack position, such cartridge holder would then be located at the infeed station 80.

If the carousel rack 88 has been fully loaded with a cartridge holder 100 at each of the rack positions, the cartridge holders will be supported at their cam rollers 116 by the track plate flange 121 except for the cartridge holder located at the infeed station 80. When thusly supported, the bottom of each cartridge holder, excepting the cartridge holder at the infeed station, will be spaced above the top surface 170 of the main support plate 76 as best illustrated at the right in FIG. 7. On the other hand, the cam roller of the cartridge holder at the infeed station will not be supported by the track plate flange because of the discontinuity 162. Instead, the cam roller of such cartridge holder will be at a lower elevation above the lower cam segment 159 of the barrel cam 155 and below the retainer plate 163 as indicated in broken lines at the left in FIG. 7. The lower cam segment 159 of the barrel cam is at an elevation which permits the cartridge holder at the infeed station to rest atop the main support plate.

In a manner that will be discussed below, the transport mechanism 77 operates to remove sequentially the TLD cards from the cartridge holder then located at the infeed station 80. Once such cartridge holder at the infeed station is emptied of TLD cards as detected by a sensor 172 (FIG. 4), the infeed carousel assembly 71 is then operated to index a new cartridge holder to the infeed station by 45° rotation of the carousel rack 88.

To rotate the carousel rack 88 through 45°, the motor 144 is operated to rotate simultaneously the driver wheel 135 and the barrel cam 155 through 360°. As the barrel cam rotates, the cam surface 158 will move beneath the cam roller 116 of the cartridge holder 100 at the infeed station 80 to raise such cartridge holder. At the same time, the driver wheel will be rotating but not the cartridge rack 88 until the cam roller 141 of the driver wheel engages a slot 139 in the driven wheel 130 of the Geneva mechanism at the end of its dwell segment. By the time the cam roller 131 engages a slot 139 in the driven wheel 130, the barrel cam will have rotated to present its upper horizontal cam segment 160 to the cam roller of the cartridge holder at the infeed station such that the cam roller of such cartridge holder will then be at the same elevation as the top surface of the track plate flange 121. Then as the driver wheel rotates the driven wheel 130 to rotate the carriage rack, the cam roller of the cartridge holder at the infeed station will then roll from the barrel cam onto the track plate flange 121. At the same time, the cam rollers of the other cartridge holders will roll on the track plate flange 121 as the cartridge rack is indexed through 45° to position another cartridge holder at the infeed station. The cam roller of the next cartridge holder also will roll onto the upper horizontal cam segment 160 of the barrel cam.

Rotation of the cartridge rack 8 will cease when the cam roller 141 of the driver wheel 135 exits the slot in the driven wheel 130 to begin the dwell period of the Geneva mechanism. After this, continued rotation of the barrel cam 155 will effect lowering of the cartridge holder then at the infeed station 80 as the cam roller thereof rolls along the descending segment 161 of the barrel cam surface. Upon completion of 360° rotation of the barrel cam as detected by the sensor 165a, a new cartridge holder will have been lowered down onto the main support plate 76. That is, the lower horizontal cam segment 159 of the barrel cam will then be located beneath the cam roller of the new cartridge holder and the cam roller of such cartridge holder will be vertically trapped between the barrel cam and the retainer plate 163 to prevent any significant lifting of the cartridge holder at the infeed station.

As above indicated, the outfeed carousel assembly 75 is essentially a mirror image of the above described infeed carousel assembly 71. The outfeed carousel assembly operates in similar manner to index cartridge holders to and from the outfeed station 82. During sequential transfer of TLD cards from the infeed station to the outfeed station, the outfeed carousel assembly also operates to raise and lower a cartridge holder at the outfeed station. That is, the cartridge holder may be raised clear of the main support plate without being moved from the outfeed station by rotating the barrel cam from sensor 165a approximately 90° to sensor 165b. The Geneva driver rotates with the cam but causes no motion of the driven wheel as this motion is within the dwell period.

The Transport Assembly (First Embodiment)

Figure 4:
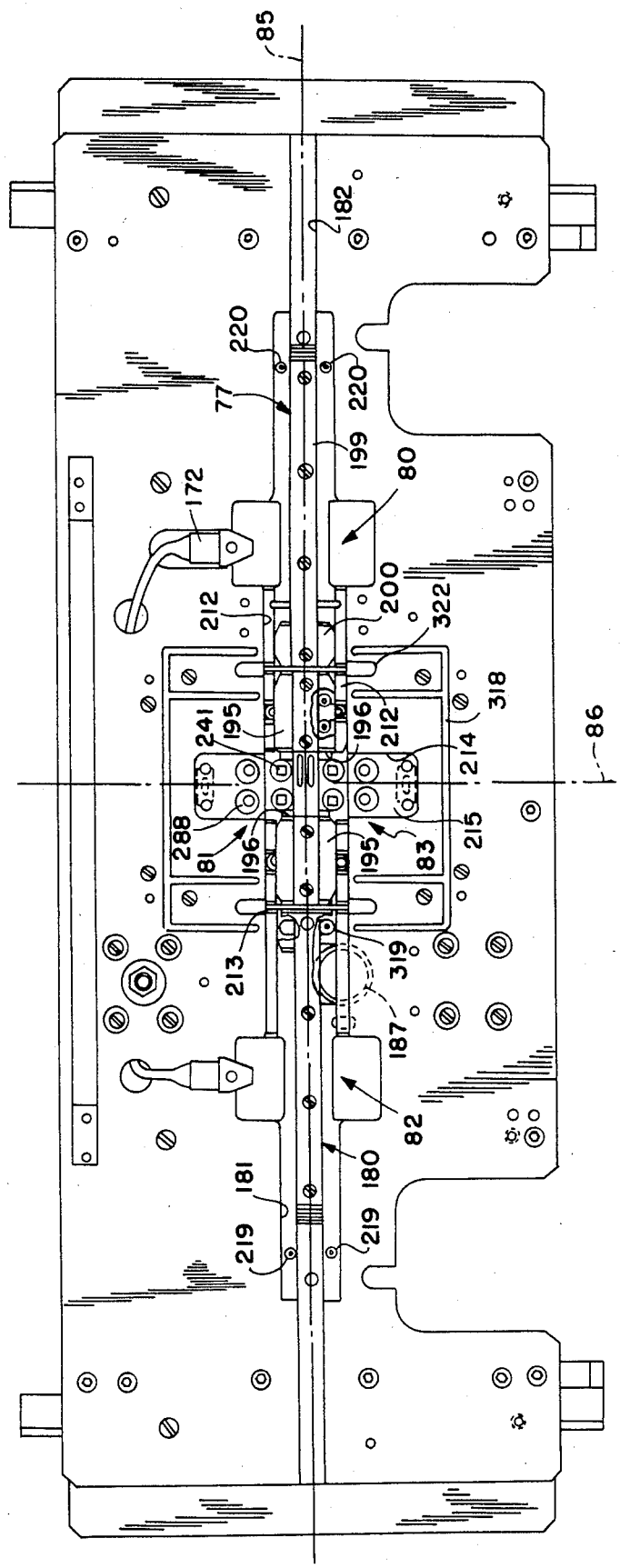
FIG. 4 is a horizontal section through the card transport and reader mechanism of FIG. 1 taken substantially along the line 4—4 of FIG. 3.

Turning now to the transport assembly 77, such assembly can be seen in FIG. 4 to include a shuttle assembly 180. The shuttle assembly 180 slides longitudinally in a shuttle guide track or slot 181 formed in the main support plate 76 at its top surface. The guide track 181 extends along the longitudinal center line 85 and as seen in FIG. 3, a narrower width rack slot 182 is transversely centered to and depends from the shallower guide track 181. The ends of the guide track 181 may terminate short of respective ends of the rack slot 182 as shown in FIG. 4.

With reference to FIGS. 4, 11 and 12, the shuttle assembly 180 includes a rack 185 which travels in the rack slot 182. As seen at 186, one side of the rack is formed with teeth in mesh with a driver pinion 187 shown in FIG. 4. Accordingly, rotation of the driver pinion 187 about its vertical axis will drive the rack longitudinally in the rack slot.

Any suitable means may be used to mount and controllably rotate the driver pinion 187 to effect controlled movement and positive positioning of the rack 185 and thus the shuttle assembly 180. By way of example, a pinion drive assembly may be mounted to the underside of the main support plate 76 as seen at 188 in FIG. 3. The illustrated drive assembly 188 includes a drive motor 189 which is drivingly connected to the driver pinion 187 by gearing 190. Also provided is a flag sensor 191 fixed to one of the gears of the gearing 190 such that it moves through a circular path simultaneously with rotation of the driver pinion. Along such circular path, four position sensors 192 are located at circumferentially spaced positions for identifying indirectly an infeed position, read position, irradiation position and outfeed position of the shuttle assembly, respectively. Of course, other means may be employed to effect controlled movement and positioning of the shuttle assembly for operation in the below discussed manner.

The shuttle assembly 180 further includes a pair of fixture plates 195 of generally rectangular shape. The fixture plates 195 are secured flatly atop the rack 185 with their inner end surfaces 196 parallel and spaced apart by an amount slightly greater than the narrow dimension of a TLD card. Accordingly, the fixture plates define therebetween a slot in the shuttle assembly for a TLD card resting flatly atop the rack 185 with its long axis extending normal to the movement axis of the rack. Further in relation to the TLD card the fixture plates have a width slightly greater than the long dimension of the card and a thickness about equal the card thickness. Also, the inner end face 196 of each fixture plate may have a lower vertical portion of a height less than the thickness of the TLD card and an upper beveled corner portion.

Outwardly of each fixture plate 195, a respective top plate 199 is secured flatly atop the rack 185. The top plates 199 have the same thickness (height) as the fixture plates. Each top plate extends to the respective end of the rack and has a width equal the width of the rack except at inner end portions 200 which are equal in width to the fixture plates. The side edges of the inner end portions of each top plate may be tapered similarly to the side edges of the fixture plates as shown.

The relatively adjacent end faces of the fixture and top plates 195 and 199 are slightly spaced apart longitudinally to form a rounded V-shape slot 205 therebetween. As seen in FIG. 12, the rounded vertex 206 of the V-shape slot 205 may be formed in the top surface of the rack 185 at the gap between the fixture and top plates.

The fixture plates 195 and the top plates 199 at their inner or wider end portions 200 have bonded to their undersides respective flat bearings 208 and 209. During longitudinal movement of the rack assembly, the bearings 208 and 209 ride on the bottom surface of the guide track 181 at each side of the rack slot 182.

The bearings 208 bonded to the underside of the fixture plates 195 longitudinally project inwardly beyond the inner end faces 196 of such plates. The top surfaces of such bearings are flush with the top surface of the rack 185 to provide additional support for a TLD card received in the slot formed between the two fixture plates. That is, the inwardly projecting ends of the bearing plates 208 serve as corner supports for respective corners of the TLD card when captured in the shuttle assembly between the fixture plates. This prevents any teetering of the card on the rack.

As seen in FIG. 4, end portions of the shuttle guide track 181 have a width corresponding to the width of the fixture plates 195. However, the guide track intermediate its end portions may be made wider than the fixture plates to accommodate a number of filler strips 212 at the sides of the path along which the fixture plates move. The filler strips engage the flat sides of the fixture plates to guide the same during longitudinal movement of the shuttle assembly. The filler strips at each side of the guide track are spaced apart to form slots 213 therebetween with which the slots 205 formed between the fixture and top plates will coincide transversely when the shuttle assembly is in its read position illustrated in FIG. 4. Also, the innermost filler strips terminate short of transversely extending guide channels 214 at opposite sides of the guide track which accommodate the reference light shutters 215 of the reference light assembly hereinafter more fully described.

In FIG. 4 the shuttle assembly 180 is shown in its read position locating the card slot thereof at the read station 81. From such read position, the shuttle assembly can be driven to the left in the guide track 181 until the wide portion 200 of the lefthand top plate 199 engages a pair of bumpers 219 mounted to the main support plate 76 at the lefthand end of the guide track. The shuttle assembly also can be driven to the right until the wide portion of the righthand top plate engages another pair of bumpers 220 mounted to the main support plate at the righthand end of the guide track. The bumpers 219 and 220 accordingly define end stroke positions of the shuttle assembly which correspond to infeed and outfeed positions of the shuttle assembly.

When the shuttle assembly 180 is positioned at its right shifted or infeed position, the card slot thereof will be located at the infeed station 85 for receipt of the bottommost card of a stack of TLD cards held in the cartridge holder 100 then positioned at the infeed station by the infeed carousel 71. As seen in FIGS. 11 and 12, the cartridge holder 100 straddles the shuttle assembly with the feet thereof resting atop the main support plate 76. The feet 110 of the holder may be accommodated in a shallow pocket 222 formed at each side of the shuttle track in the main support plate so that the top surfaces of the feet are slightly above the bottom surface of the shuttle guide track at essentially the same level as the top surface of the rack 185.

It is noted that the rack 185 of the shuttle assembly 180 will be clear of the infeed station 80 when the shuttle assembly is at its left shifted or outfeed position. Accordingly, the bottommost TLD card in the cartridge holder 100 at the infeed station will then be supported atop the cartridge holder feet 110 slightly above the bottom surface of the shuttle guide track. When the shuttle assembly is driven to the right from its outfeed position, it will move beneath the stack of TLD cards between the feet 110. As this occurs, the bottommost TLD card of the stack will ridge up a chamfer 225 at the righthand end of the shuttle assembly and then along the top surface of the shuttle assembly until the card slot of the shuttle assembly aligns vertically with the stack of cards in the cartridge holder at the infeed position of the shuttle assembly (FIGS. 11 and 12). At this point the bottommost TLD card, indicated at 30 in FIGS. 11 and 12, will drop into the card slot where it then will be supported on the top surface of the rack 185 and the top surfaces of the projecting ends of the bearing plates 208, which top surfaces may be slightly spaced above the top surfaces of the cartridge holder feet 110.

With the bottommost TLD card 30 now received in the card slot of the shuttle assembly, such assembly may be driven towards the viewer in FIG. 11 and to the left in FIG. 12 to edgewise remove the lowermost card from the cartridge holder 100. As the shuttle assembly thusly moves, the bottommost card will pass through the bottom slot 113 of the cartridge holder. As previously indicated, the bottom slot 113 is sized to allow edgewise passage of only the bottommost card whereby the card next adjacent that being removed will be restrained by the lips 108 of the cartridge holder from passing out of the cartridge holder along with the lowermost card.

In a partly similar but reverse manner, a TLD card carried by the shuttle assembly 180 may be fed into a cartridge holder 100 located at the outfeed station 82 by the outfeed carousel 75. As the lefthand end of the shuttle assembly moves beneath the cartridge holder at the outfeed station, the bottommost one of any cards already stacked in the cartridge holder will ride up a chamfer 227 (FIG. 12) at lefthand end of the shuttle assembly and then along the top surface of the shuttle assembly. As the shuttle assembly nears the end of its stroke, the card carried thereby will pass edgewise through the bottom slot 113 of the cartridge holder at the outfeed station and over the cartridge holder feet 110. When the shuttle assembly stops at its outfeed position, the card therein will then be positioned beneath and support thereon any cards already held in the cartridge holder at the outfeed station.

At this point, the barrel cam 155 of the outfeed carousel assembly 75 is rotated 90° as above discussed to lift the cartridge holder at the outfeed station and the cards therein above and clear of the shuttle assembly 180. After the cartridge holder has been thusly lifted to raise the newly received bottommost card therein above the shuttle assembly, the shuttle assembly is driven to the right for transport of a next card through the reader. The barrel cam is then rotated back to its original position to lower the cartridge holder down onto the main support plate 76 by which time the card slot in the shuttle assembly will have been moved out of vertical alignment with the cartridge holder at the outfeed station.

The Hot Finger And Reference Light Assembly (First Embodiment)

The hot finger and reference light assembly 83 is best shown in FIGS. 13–16. For use with TLD cards having up to four TL elements, the assembly includes four hot finger assemblies 240 which may be of conventional type. The hot finger assemblies 240 include respective vertical hot fingers 241 which extend upwardly through respective bores 242 in the main support plate 76 which open at the bottom surface of the shuttle track 181. For TLD cards containing up to four TL elements as above indicated, there are four hot finger assemblies and the hot fingers thereof are arranged in a rectangular pattern which corresponds to the rectangular pattern of the positions for the TL elements in the TLD card.

The hot fingers 241 are positioned closely together for alignment with respective TL elements of the TLD card. To the accomplishment of this and other features of the invention, each hot finger assembly is secured at its energizing coil 244 to a respective one of four quadrant spaced guide brackets 245. The guide brackets 245 are C-shape in vertical section and each guide bracket is yieldingly biased upwardly independently of the other guide brackets while further provision is made for commonly moving the hot finger assemblies downwardly.

Figure 13:
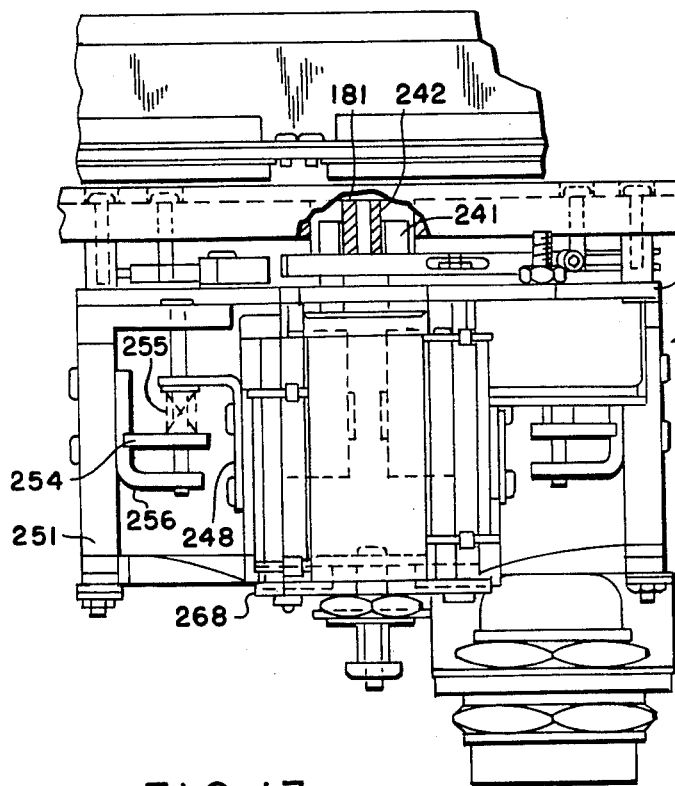
FIG. 13 is an elevational view showing the hot finger and reference light assembly of the card transport and reader mechanism of FIG. 1.
Figure 14:
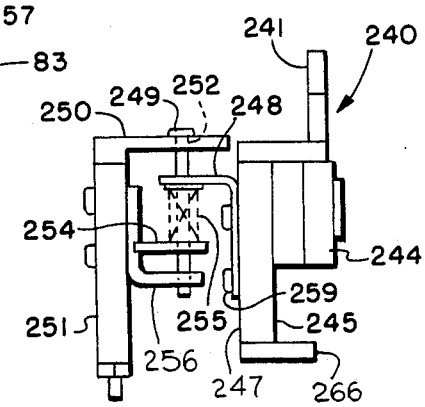
FIG. 14 is an elevational view showing further details of the hot finger assembly of FIG. 13.

As representatively shown in FIGS. 13 and 14, each guide bracket 245, at a vertical surface 247 remote from adjacent guide brackets, has secured thereto the vertical leg of an L-shape spring retainer 248. The other leg of the spring retainer extends horizontally and has a guide bore through which the vertical shank of an adjustment/guide screw 249 passes. The head of the adjustment/guide screw 249 is supported atop a horizontal flange 250 of a mounting bracket 251 which has an oversized bore 252 through which the shank of the screw depends.

Below the spring retainer 248, a pressure shoe 254 is threaded onto the lower threaded end portion of the adjustment/guide screw 249. Interposed between the pressure shoe 254 and the spring retainer on the screw shank is a coil spring 255 which resiliently urges upwardly the spring retainer and consequently the hot finger assembly 24. The spring tension may be easily adjusted by turning the adjustment/guide screw relative to the pressure shoe thereby to move the shoe upwardly to increase the biasing force or downwardly to lessen the biasing force. To prevent rotation of the shoe with the screw during such adjustment, the pressure shoe is keyed at an edge slot to the vertical leg of an L-shape pressure shoe guide 256. The pressure shoe guide 256 is secured to the mounting bracket 251 depending from a base plate 257, and such pressure shoe at its horizontal leg additionally serves to support at a guide hole therein the lower end of the adjustment/guide screw.

Accordingly, each hot finger assembly 240 is independently urged upwardly by a respective spring 255 independently of the other hot finger assemblies. Such upward movement is limited by engagement of the spring retainer 248 against the bottom surface of the mounting bracket flange 250. At such upper position of the hot finger assembly, the hot finger 241 thereof will protrude above the bottom surface of the shuttle track 181 for engagement with respective TL elements of a TLD card then located by the shuttle assembly 180 at the read station 81.

Precise vertical positioning of the hot finger 241 relative to the TLD card may be accomplished by vertically adjusting the guide bracket 245 relative to the spring retainer 248. To this end, the spring retainer may be provided with vertically elongated holes through which extend the attachment screws 25 that serve to secure the spring retainer to the guide bracket. As is preferred, the guide bracket is vertically adjusted relative to the spring retainer such that when the spring retainer is engaged against the bottom side of the flange 250, the top end of the hot finger will engage the lower plastic sheet covering the TL element just before the spring retainer would engage the underside of the flange 250. Accordingly, the hot finger will be forcibly engaged against the lower plastic sheet for better heat conduction to the TL element. The plastic sheets encapsulating the TL element will heat up and become soft whereupon the hot finger will push the TL element upwardly and out of its normal plane when the plastic sheets at room temperature. However, such additional upward movement of the hot finger will be limited by engagement of the spring retainer against the underside of the flange 250 thereby to limit maximum upward movement of the hot finger to less than that which might cause permanent damage to the plastic sheets encapsulating the TL element.

The mounting bracket 251 associated with each hot finger assembly 240 is mounted to the underside of the base plate 257 by a pair of screws 262. As seen in FIG. 15, the screws 262 extend through an elongated slot 263 in the base plate to permit precise longitudinal positioning of the associated hot finger relative to such mounting plate. The slot 263 also is laterally (transversely) oversized to allow for precise transverse positioning of the hot finger. Accordingly, each hot finger may be individually adjusted both longitudinally and transversely with respect to the base plate as well as vertically in the previously discussed manner.

Respecting vertical lowering of the hot finger assemblies 240, the lower horizontal arm 266 of each guide bracket 245 underlies a respective corner of a rectangular retainer plate 267 as seen in FIG. 16. The retainer plate 267 is secured to a horizontal retainer bar 268 for movement therewith. Each end of the retainer bar 268 is connected to the plunger 269 of a respective vertically oriented solenoid 270 secured at its coil housing 271 by a respective bracket 272 to and beneath the base plate 257. The solenoids are of such type that upon energization, the plungers thereof are extended thereby to move the retainer bar downwardly. As the retainer bar moves downwardly, the retainer plate will engage the lower arms 266 of the guide brackets 245 thereby to lower the hot finger assemblies against the biasing force exerted by the springs 255. When thusly lowered, the hot fingers 241 of the hot finger assemblies will be located below the bottom surface of the shuttle track 181 so as not to interfere or obstruct movement of the shuttle assembly 180.

Also shown in FIGS. 13, 15 and 16 is an actuating mechanism 280 for the reference light shutters 215. The actuating mechanism 280 includes a control arm 281 and an actuating arm 282 both mounted for swinging movement about respective pivots 283 and 284 in a horizontal plane between the base plate 257 and the main support plate 76. In relation to the longitudinal and transverse center lines 85 and 86, the pivots 283 and 284 are transversely aligned and the control and actuator arms generally extend longitudinally from the pivots across the transverse center line 85. Generally at the transverse center line 85, the control and actuator arms are provided with pins 285 and 286 which extend upwardly through slots in the main support plate 76 and into longitudinally extending slots in the reference light shutters 215, respectively. When the arms are swung inwardly from their solid line to their phantom line positions in FIG. 15, the shutters will be transversely shifted from their positions clear of the shuttle track 181 to inner positions locating the reference lights 288 carried thereby (see FIG. 4) at respective positions corresponding to respective TL element positions, i.e., above respective hot fingers 241 which, as discussed below, are aligned with respective photomultiplier tubes of the PMT assembly. In reverse manner, the shutters may be shifted to their transversely outer positions clear of the guide track 181 by swinging of the actuator and control arms from their phantom line to their solid line positions.

At its pivot 283, the control arm 281 is coupled to the armature of a rotary solenoid 290 which operates to swing the control arm between its solid line and phantom line positions. Rather than providing a separate solenoid for the actuator arm 282, the actuator arm instead is connected to the control arm by a connecting link 291. The connecting link 291 is pivotally connected between the control arm and actuator arm such that upon swinging of the control arm, like but opposite swinging of the actuator arm is effected. That is, the actuator and control arms will move simultaneously towards or away from each other.

The PMT Assembly (First Embodiment)

With reference to FIGS. 2 and 3, the PMT assembly 73 includes light sensors which preferably are photomultiplier tubes 300 of the type commonly used to measure thermoluminescence. The photomultiplier tubes 300 are retained in respective vertical bores of a mounting block 301. The mounting block 301 is secured at a bottom plate 302 to a mounting plate 303 which in turn is secured atop the main support plate 76 at the read station 81. As seen in FIG. 3, the mounting plate 303 closes the top side of the shuttle guide track 181 to form a narrow passageway for longitudinal passage of the shutter assembly 180 (not shown in FIG. 3) and a card transferred edgewise by such shutter assembly in the above described manner.

In the illustrated preferred embodiment, there are four photomultiplier tubes 300 arranged in a rectangular pattern corresponding to the rectangular arrangement of the TL elements in the TLD card. Accordingly, the photomultiplier tubes will align vertically with respective TL elements of a TLD card located at the read station 81 by the shutter assembly 180. Each photomultiplier tube is optically coupled to a respective light pipe 306 which serves to collate the light emitted by a respective TL element located beneath the photomultiplier tube. Each light pipe 306 is retained in respective aligned vertical bores in the mounting plate 303 and bottom plate 302 as shown in FIG. 3.

The mounting block 301 may be surrounded by insulation 308 which may extend to the outer side walls of a cover 309. The mounting block also may be thermally coupled by heat conduction blocks 310 to a heat sink 311 outside the cover for cooling of the photomultiplier tubes 300.

The photomultiplier tubes 300 are individually powered and for this respective power line jacks 314 are mounted to the top wall of the cover 309. Each photomultiplier tube also has associated therewith a respective output jack 315 mounted to the top wall of the cover. The output jacks 315 provide for parallel coupling of the photomultiplier tubes to respective channels of electrical circuitry located externally of the PMT assembly 73. Accordingly, the photomultiplier tubes may be operated simultaneously to sense light emitted from four TL elements in a TLD card thereby to reduce the required read time in relation to other TLD card readers which sequentially read the TL elements in a TLD card. Essentially there is a fourfold decrease in the time needed to read a TLD card containing four TL elements.

To ensure that no ambient light reaches the photomultiplier tubes 300, the mounting plate 303 is sealed to the main support plate 76 as by gasket rope 318 retained in grooves formed in the top surface of the main support plate as shown in FIG. 4. However, such gaskets will not protect against the entry of light through the passageway for the shuttle assembly 180. In accordance with the subject invention, such entry of light is prevented by light seal pinions which engage respective sides of the rack 185 of the shuttle assembly at respective ends of the shuttle passageway formed between the mounting plate 303 and the main support plate 76. One such light seal pinion is representatively shown at 319 in FIG. 4 and can be seen to be mounted for rotation about its vertical axis to the main support plate in a generally semi-circular recess at the side of the slot 182 in which the rack travels. Of course, a similar pinion would be similarly provided at the other side of the rack and another pair of such pinions at the other end of the passageway.

Respecting entry of light along the top surface of the shuttle assembly 180, such is prevented by a transversely extending light seal at each end of the passageway formed between the mounting plate 303 and main support plate 76 at vertically aligned, transversely extending grooves 322 and 323 respectively formed in such plates. In FIGS. 17 and 18, a representative one of the light seals is indicated at 324 and can be seen to have a star-like cross sectional shape. The light seal 324 has plural circumferentially spaced, radiating splines 325 which extend at least the width of the shuttle assembly 180 and between end journals 326. For the most part, the seal is housed in the transversely extending groove 323 formed in the bottom surface of the mounting plate 303 with the ends of such groove located above the transverse grooves 322 formed in the main support plate 76 (FIG. 4). The light seal accordingly will be retained against longitudinal movement in the groove 323 particularly at its narrow ends accommodating the end journals 326, but such 323 groove is sized to permit lifting and rotation of the light seal on its axis.

During longitudinal movement of the shuttle assembly 180, the vertices of two splines 325 will ride on the top surface of the shuttle assembly as indicated in phantom lines in FIG. 17. However, as the shuttle assembly moves into its read position locating a TLD card at the read station 81, one spline of the light seal will drop into the transverse slot 205 at the top surface of the shuttle assembly formed between a fixture plate 195 and top plate 200. Accordingly, such spline will preclude the passage of stray light along the top surface of the shuttle assembly.

Operation of the TLD Card Reader of FIGS. 1–18

Respecting operation of the TLD card reader and more particularly the operation of the above described component assemblies of the reader, the reader necessarily will also include suitable control circuitry for implementing operation of the component assemblies in the hereinafter discussed manner and sequence. As will be appreciated, the provision of such control circuitry is well within the skill of the art and accordingly no specific control circuitry is being included herein for the sake of brevity in the description of the subject invention.

Prior to automatic operation of the TLD card reader, cartridge holders 100 with TLD cards stacked therein are loaded into the infeed carousel assembly 71 as above described. As needed, the carousel rack 88 may be indexed under manual control to facilitate loading of the cartridge holders. In the illustrated preferred embodiment, as many as 2,000 TLD cards may be held in the infeed carousel assembly for automatic processing by the reader. Also prior to automatic reader operation, empty cartridge holders are loaded into the outfeed carousel assembly 75. After the carousel assemblies have been thusly loaded, automatic reader operation may be commenced.

If the infeed carousel assembly 71 has been loaded with a full complement of cartridge holders containing TLD cards, one of such cartridge holders will then be resting atop the main support plate 76 at the infeed station 80. If the infeed carousel assembly is not fully loaded with cartridge holders or with one or more empty cartridge holders, a TLD card might not initially be located at the infeed station. If a TLD card is not detected at the infeed station by the sensor 172, the drive motor 144 of the infeed carousel assembly is operated to index the carousel rack 88 until the presence of a TLD card at the infeed station is detected by the sensor 172. Briefly referring to FIGS. 9 and 10, the feet 110 and lower ends of the side walls 102 of the cartridge holder 100 are provided with window apertures 328 allowing the sensor 172 to detect the presence of a TLD card at the bottom of the cartridge holder located at the infeed station.

When a TLD card is present at the infeed station 80, the shuttle assembly 180 is driven to its infeed position to receive such card in its card slot. The shuttle assembly is then reversely driven to transfer the TLD card out of the cartridge holder to the read station 81. Any cards stacked above the TLD card captured in the shuttle assembly and slot will remain in the cartridge holder as above discussed.

As the TLD card is transferred by the shuttle assembly 180 to the read station 81, it will pass beneath the card identification assembly 72 for reading of the identification code 40 on the TLD card. The card identification assembly 72 may be of any suitable type operable to read the machine readable identification code on the TLD card. The output of the card identification assembly may be sent to a storage device or computer for storage of the identification code along with the TL information thereafter obtained from the TLD card at the read station.

The shuttle assembly 180 will continue to move longitudinally until it reaches its read position at which point the TLD card will be centered to the read station 81. During longitudinal movement of the shuttle assembly, the solenoids 270 of the hot finger and reference light assembly 83 wil be energized to retract the hot fingers 241 clear of the shuttle guide track 181. However, when the shuttle assembly is in its read position, the solenoids 270 are deenergized to allow the hot fingers 241 to be forced upwardly and against respective TL elements in the TLD card by the springs 255. The then energized hot fingers will heat the TL elements which then will emit light in relation to the amount of exposure to radiation. The thermoluminescence of each TL element is measured by a respective photomultiplier tube 300 which has its output channeled to associated electronic circuitry for processing. The measured thermoluminescence may be used for computation of TL integrals and digitization of a glow curve in known manner and the resultant data may be sent to the external storage device or computer along with the card identification code.

After the TLD card has been read, the hot fingers 241 are again retracted clear of the path of the shuttle assembly 180. The shuttle assembly is then driven from its read position to its outfeed position. During such movement of the shuttle assembly, the TLD card captured therein will pass through the bottom transverse slot of the cartridge holder at the outfeed station 82 and into such cartridge holder. The barrel cam 155 of the outfeed carousel assembly is then rotated 90° to lift the cartridge holder and the TLD card therein clear of the shuttle assembly and when thusly cleared, the shuttle assembly is driven back to its infeed position for receiving the then bottommost card in the cartridge holder at the infeed station 80. To reposition the cartridge holder, the barrel cam of the outfeed carousel assembly is rotated 90° in the reverse direction to lower the cartridge holder at the outfeed station down onto the main support plate 76 for receipt of the next TLD card.

The aforedescribed sequence is then repeated successively to remove TLD cards from the cartridge holder at the infeed station 80 for transfer to the read station 81 and then to the outfeed station 82 for stacking in the cartridge holder at the outfeed station. When the cartridge holder at the infeed station is emptied of TLD cards as detected by the sensor 172, the drive motor for the infeed carousel assembly is operated to index the carousel rack 88 to present another cartridge holder at the infeed station for successive removal of TLD cards therefrom by the shuttle assembly. The outfeed carousel assembly also will be indexed when the cartridge holder at the outfeed station if filled with TLD cards as detected by a sensor 330 mounted above the outfeed station as seen in FIG. 3 to locate an empty cartridge holder at the outfeed station. When the infeed carousel assembly has been completely emptied of TLD cards, automatic operation of the TLD card reader will cease.

The TLD Card Reader of FIGS. 19–24

Figure 19:
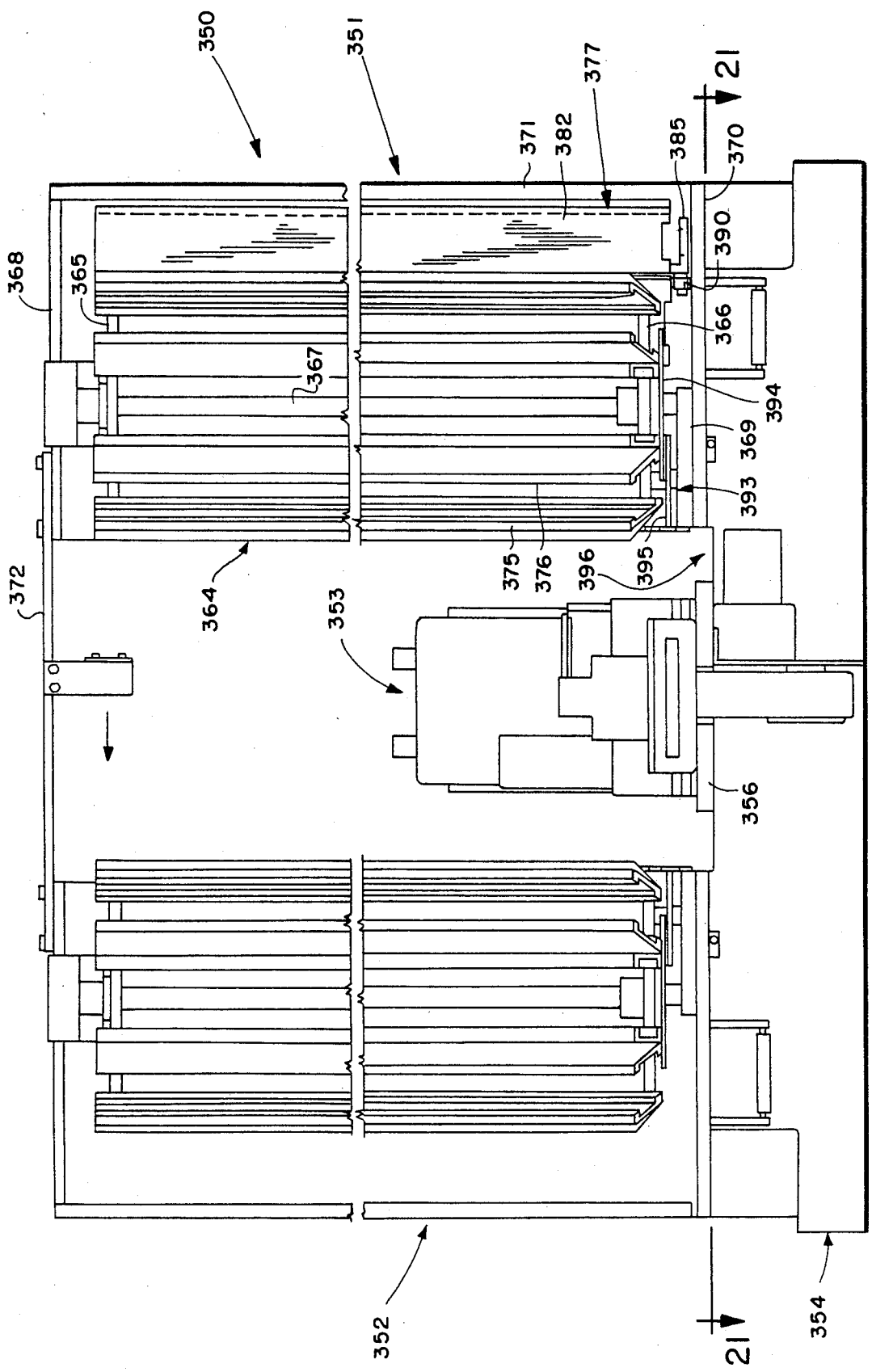
FIG. 19 is a front elevation of another embodiment of a TLD card transport and reader mechanism according to the invention.
Figure 20:
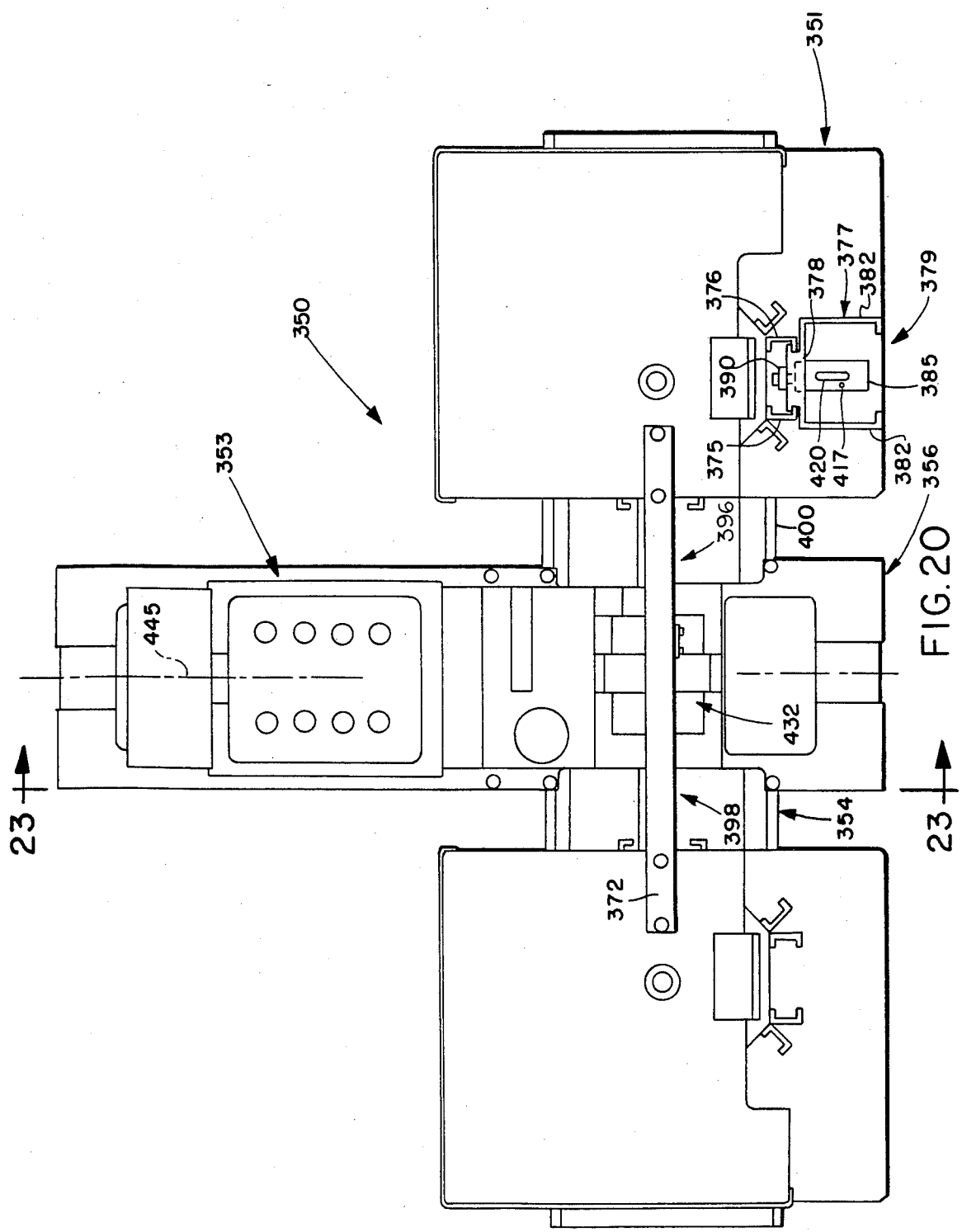
FIG. 20 is a top plan view of the TLD card transport and reader mechanism of FIG. 19.
Figure 23:
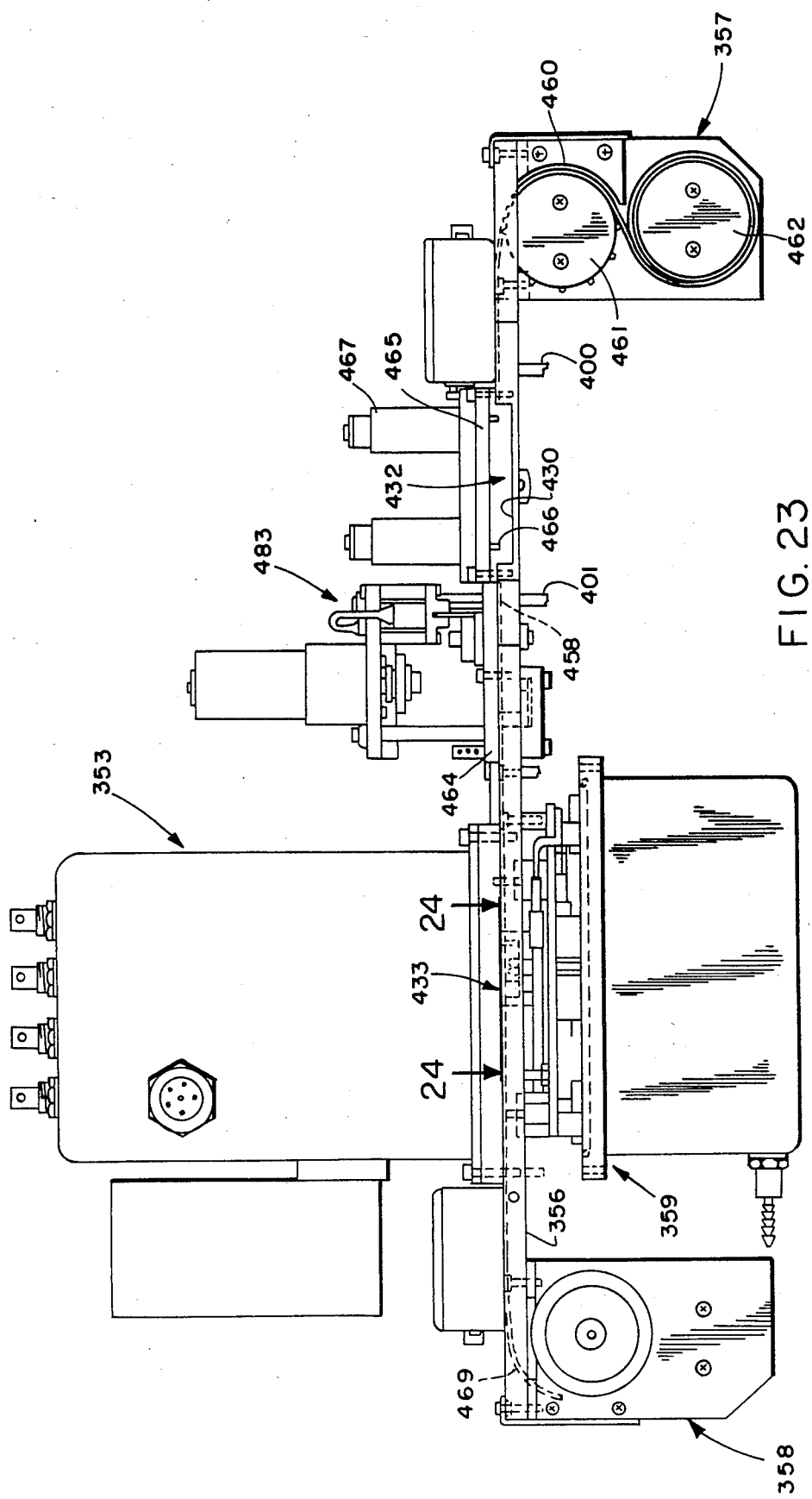
FIG. 23 is a vertical/transverse section through the mechanism of FIG. 19 taken substantially along the line 23—23 of FIG. 20.

In FIGS. 19 and 20, another embodiment of a TLD card transport and reader mechanism for a TLD card reader according to the invention is indicated generally at 350. Unlike the embodiment disclosed in FIGS. 1–18, the mechanism 350 processes both the card holders (FIGS. 27–29) and TLD cards (FIGS. 25 and 26) thereby eliminating the need to remove the TLD cards from their holders. The mechanism 350 generally comprises an infeed carousel assembly 351, an outfeed carousel assembly 352 and a PMT assembly 353. The infeed and outfeed assemblies are mounted on a horizontal main support frame 354 at respective ends of a holder transport mechanism indicated generally at 355 in FIG. 21. The main support frame 354 extends in a longitudinal direction between the carousel assemblies 351 and 352 and also has mounted thereon a horizontal support plate 356. The horizontal support plate 356 transversely crosses the main support frame 354 about midway between the carousel assemblies, and the PMT assembly 353 is mounted on the support plate 356 at a position rearwardly offset from the main support frame. The mechanism 350 further generally comprises a card feed transport assembly 357 and a card return transport assembly 358 mounted to and beneath the support plate 356 at respective transversely disposed ends of such support plate as seen in FIG. 23. As also seen in FIG. 23, a hot finger and reference light assembly 359 is mounted to and beneath the support plate in vertical opposition to the PMT assembly 353.

The Infeed and Outfeed Carousel Assemblies (Second Embodiment)

In the instant embodiment, the infeed carousel assembly 351 and the outfeed carousel assembly 352 are essentially mirror images of one another. Accordingly, only the infeed carousel assembly 351 will be described in greater detail.

As seen in FIGS. 19 and 20, the infeed carousel assembly 351 includes a carousel rack 364. The carousel rack 364 includes horizontal top and bottom rack plates 365 and 366 which are secured to a vertical center shaft 367. The vertical center shaft 367 is journaled between top and bottom plates 368 and 369 for rotation about the vertical axis of the center shaft. The bottom plate 369 is mounted atop a carousel mounting plate 370 and the top plate 368 is secured to an L-shape side plate 371 along its top edge. The side plate 371 in turn is secured along its lower edge atop the carousel mounting plate 370. For added support, the top plate 368 is connected by a tie bar 372 to the top plate of the outfeed carousel assembly 352.

The rack plates 365 and 366 have identical octagonal shapes with the facets or sides of each plate coplanar with respective sides of the other plate. A pair of vertical cartridge rails 375 and 376 are secured top and bottom to the rack plates at each respective side of such plates. The vertical outer edges of each pair of cartridge rails are turned inwardly to form guide tracks for a respective cartridge holder. A representative cartridge holder can be seen at 377 in FIG. 20 to include a vertical back wall 378 formed at its vertical side edges with slots for vertical sliding interfit with respective tracks of a respective pair of cartridge rails 375 and 376 of the carousel rack. As will be appreciated, the cartridge holder may be top loaded into the carousel rack at a loading station indicated at 379 in Fig. 20. The carousel rack is first positioned above the cartridge rails then located at the load station 379 and then lowered for sliding interfit at its slots with the cartridge rail tracks. The carousel rack may then be rotatably indexed in the below discussed manner to present another pair of cartridge rails at the load station for loading of another cartridge holder into the carousel rack. In this manner, as many as eight cartridge holders may be loaded into the carousel rack at circumferentially equally spaced positions around the axis of the carousel center shaft 367.

The cartridge holder 377 further includes vertical side walls 382 having inturned lips 383. The lips are spaced from the back wall by an amount slightly greater than the narrow dimension of a card holder whereas the side walls are spaced apart by an amount slightly greater than the long dimension of a card holder. Accordingly, a plurality of card holders may be vertically stacked one atop the other within the interior of the cartridge holder.

To prevent TLD cards from dropping out of the cartridge holder 377, a foot 385 is secured to the back wall and extends horizontally inwardly beneath the interior of the cartridge holder. When the card holders are stacked in the cartridge holder, the bottom card holder will be supported atop the foot 385. The foot is centrally spaced inwardly from the side walls 382, and the back wall 378 is recessed at its lower end to expose the adjacent edge surface of the bottommost card holder at respective corners thereof for a reason that will become more apparent below. Also, the vertical lips of the cartridge holder are notched at their lower ends to form a transverse slot at the bottom of the cartridge holder through which the bottommost card holder and only the bottommost card holder may be withdrawn edgewise from the cartridge holder. Of course, the width of the slot is greater than the long dimension of the card holder for free passage of the card holder through the slot.

The cartridge holder 377 also is provided with a cam roller 390 secured by a shoulder screw to the back wall 378 of the cartridge holder for rotation about an axis normal to the planar extent of the back wall. The cam roller is located at the bottom of the cartridge holder and projects slightly therebeneath. The cam roller rolls on the top surface of the carousel mounting plate 370 and supports the bottom of the cartridge holder slightly above the top surface of the carousel mounting plate as seen in Fig. 19.

As schematically shown in FIG. 19, a Geneva mechanism 393 is provided for effecting intermittent 45° indexing rotation of the carousel rack. The driven wheel 394 is rotatably coupled to the carousel rack whereas the driver wheel 395 may be rotated by any suitable means and generally in the manner described above in connection with the infeed carousel assembly 71 of the first illustrated embodiment of the invention. During such indexing of the carousel rack, the cam rollers 390 of the cartridge holders will ride on the top surface of the carousel mounting plate 370 and support the cartridge holder slightly above such top surface of the carousel mounting plate. When not being rotated, the carousel rack 364 will locate one of the cartridge holders therein adjacent and in longitudinal alignment with an infeed station 396.

Although not shown, the infeed carousel assembly 351 also includes a barrel cam like the barrel cam 155 of the infeed carousel assembly of the first illustrated embodiment of the invention. The barrel cam operates in similar manner to raise and lower cartridge holders at the infeed station 396 during indexing of the carousel rack 364. In the instant embodiment the barrel cam is secured to the same shaft as the driver wheel for common 360° rotation therewith when the infeed carousel assembly is operated to index the carousel rack by 45°.

The foregoing description of the infeed carousel assembly is equally applicable to the outfeed carousel assembly 352 except that the latter is oppositely disposed at an outfeed station 398.

The Card Holder Transport Assembly (Second Embodiment)

Figure 21:
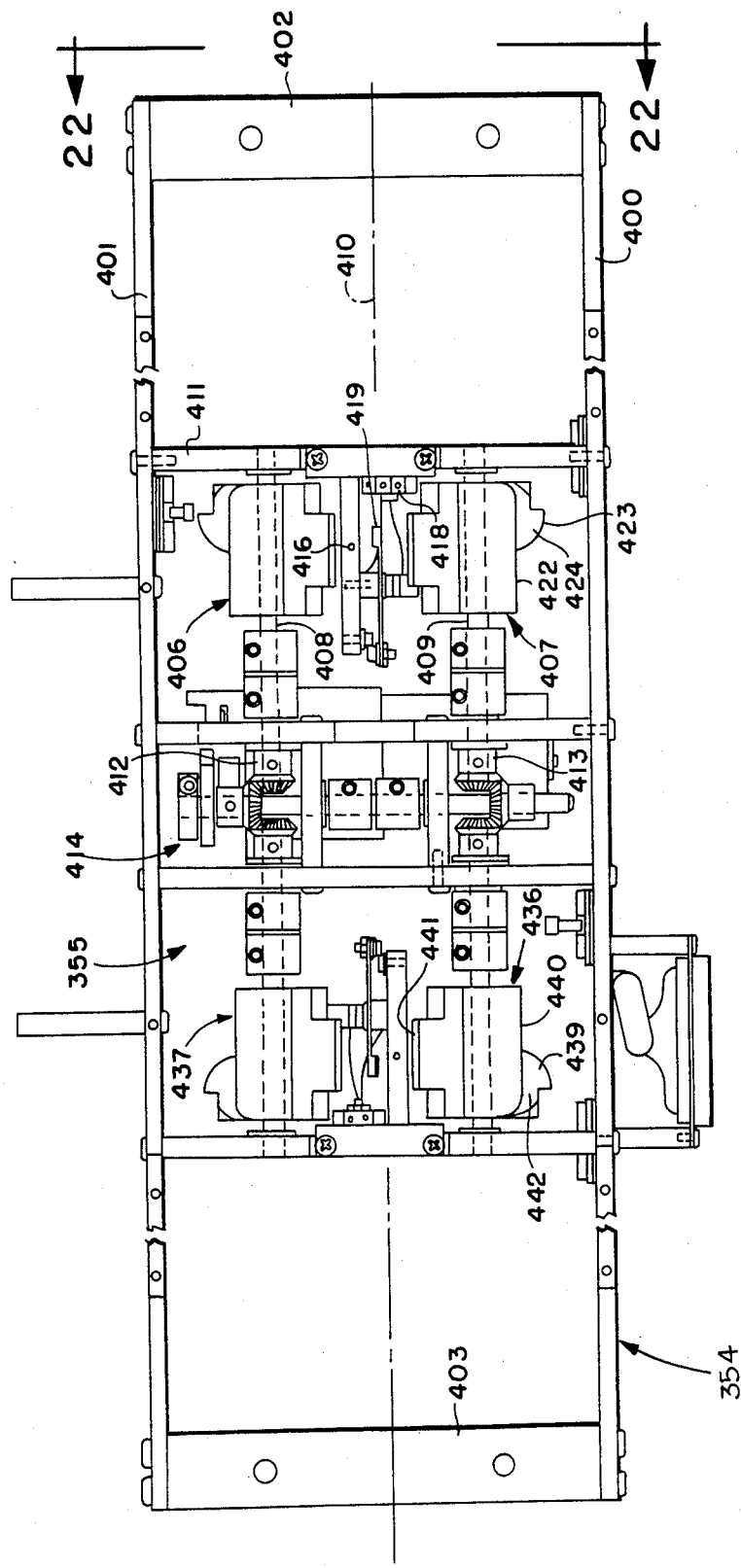
FIG. 21 is a horizontal section through the mechanism of FIG. 19 taken substantially along the line 21—21 of FIG. 19.

Referring now to the card holder transport assembly 355, such assembly is generally mounted within the interior open space of the main support frame 354 as seen in FIG. 21. The main support frame 354 includes longitudinally extending side rails 400 and 401 which are connected at their ends by respective transversely extending tie bars 402 and 403. At their top edges, the side rails 400 and 401 support the carousel mounting plates 370 of the infeed and outfeed carousel assemblies as best seen in FIG. 19.

The card holder transport assembly 355 includes a pair of worm-like cams 406 and 407 which are transversely spaced apart beneath the infeed station 396. The cams 406 and 407 are keyed to respective cam shafts 408 and 409 which are parallel to and transversely equally spaced from the longitudinal center line 410 of the transport assembly. At their longitudinally outer ends, the cam shafts are supported for rotation about their axes by a vertical bearing plate 411 which extends transversely between the longitudinal side rails 400 and 401 of the support frame. At their longitudinally inner ends, the cam shafts are coupled by respective coupling shafts 412 and 413 to a drive motor and gear mechanism indicated generally at 414 which operates to simultaneously rotate the cams but in opposite directions. In FIG. 22, the righthand cam 406 rotates counterclockwise whereas the lefthand cam 407 rotates clockwise.

As seen in FIG. 22, the cams 406 and 407 are transversely spaced to accommodate therebetween the cartridge holder foot 385. The top edge of the bearing plate 411 is centrally recessed for mounting of a cartridge locating pin 416 which engages a pilot hole 417 (FIG. 30) in the cartridge foot as the cartridge holder is lowered at the infeed station 396 during operation of the carousel rack assembly 351. Such engagement of the locating pin and pilot hole serves to properly locate the cartridge holder relative to the cams. Also provided is a sensor 418 which is operable to detect the presence of a cartridge holder at the infeed station and a card holder sensor 419 which will extend through a slot 420 (FIG. 30) in the cartridge holder foot for detecting the presence of a card holder in the cartridge holder.

The righthand and lefthand cams 406 and 407 are essentially mirror images of one another. Each cam has a cylindrical core 422 and an outer worm 423 which wraps around the core to form a helical pusher surface 424 extending from a beginning point 425 at the outer end of the cam to an ending point 426 near the inner end of the cam. At the outer end of the cam, the worm has a radial thickness equal the thickness of the TLD holder which increases at curved surface 427 to a radial thickness equal to the combined thicknesses of two TLD holders.

The bottommost card in a cartridge holder at the infeed station 396 will be positioned atop the cams 406 and 407 with its narrower ends located approximately in vertical alignment with the axes of the cams. At the idle position of the cams seen in FIG. 22, the beginning point 425 of the cam pusher surfaces 424 will be located arcuately outwardly away from the ends of the cartridge holder and slightly longitudinally outwardly of the outermost longer edge surface of the cartridge holder. When the cams are rotated, the beginning point of the pusher surfaces thereof will engage the outer edge surface of the card holder at respective corners of the holder and then progressively push the cartridge holder inwardly along the longitudinal center line 410 towards a longitudinally extending holder track 430 (FIG. 23) formed in the top surface of the support plate 356. As the cams continue to rotate to push the card holder edgewise through the bottom slot of the cartridge holder, the greater thickness portion of the worm (beginning at 427) will move beneath the next lowermost card holder in the cartridge holder which then will be supported atop the radially outer surface 431 of the worm during further rotation of the worm. After 360° C. rotation of the worms, the card holder being pushed thereby will have been advanced into the holder track 430 in the support plate and the next lowermost card will have been lowered in the cartridge holder to the position previously occupied by the card holder that has just been removed from the cartridge holder.

When the cams 406 and 407 are again rotated, the next card holder will be longitudinally advanced edgewise out of the cartridge holder through the bottom slot thereof and into the holder track 430 in the support plate 356. Consequently, it will engage and push the preceding card holder along the holder track to a card removal station 432 in transverse alignment with a read station 433 beneath the PMT assembly 353. By further successive removal of card holders from the cartridge holder by the cams, a train of edge abutted card holders will be formed and advanced successively along the longitudinal center line 410 of the transport assembly (right to left in FIGS. 19 and 20). As each card holder is pushed from the card removal station 432, it will be advanced first to an intermediate position and then to the outfeed station 398 adjacent the outfeed carousel assembly 352.

Beneath the outfeed station 398, the transport assembly 355 includes another pair of worm-like cams 436 and 437. The cam pair at the outfeed station is essentially a mirror image of the cam pair at the infeed station and the cams at the outfeed station are rotatably driven in opposite directions by the same motor drive and gear mechanism 414 as the cams 406 and 407 at the infeed station.

As a card holder is advanced over the cams 436 and 437 at the outfeed station 398, it will move towards the spiral surface 439 of the worm. Since the cams are rotated simultaneously with the cams at the infeed station, the card holder can be advanced over the core 440 of outfeed cams and into the cartridge holder at the outfeed station through the bottom slot thereof. When a next card holder is advanced longitudinally to the outfeed cams, the preceding card holder will be raised atop the radially outer surface 441 of the greater thickness portion of the worms 442 thereof to permit the next card holder to move beneath the preceding card holder. That is, the preceding card holder will be raised in the cartridge holder at the outfeed station and the next card holder pushed therebeneath. In this manner, the card holders are sequentially stacked in the cartridge holder at the outfeed station.

As above indicated, the card holders are successively delivered to the card removal station 432. At such station, the TLD card is removed from the card holder through one end of the card holder for transfer to the read station 433 along a transverse center line indicated at 445 in FIG. 20. After the TLD card has been read at the read station, the card is then transferred back into the card holder. Such transfer of the TLD card is effected by the above indicated card transport assemblies 357 and 358.

The Card Transport Assemblies (Second Embodiment)

As above indicated, the card transport assemblies 357 and 358 are mounted at respective ends of the support plate 356. In addition to the longitudinally extending holder track 430, the support plate also has formed at its top surface a transversely extending card track 458 which intersects the holder track. The bottom surface of the card track is at a higher elevation than the bottom surface of the holder track so that the card being removed from the holder will pass from the card holder at the card removal station onto the bottom surface of the card track.

As seen in FIG. 23, the card feed transport assembly 357 includes a flexible tongue 460, a drive sprocket 461 and a storage reel 462 for the flexible tongue. The flexible tongue may be formed from a strip of thin sheet metal and provided with sprocket holes spaced along its length for engagement with the sprocket teeth of the drive sprocket 461.

Initially the flexible tongue 460 will be transversely retracted clear of the card holder track 430 during indexed advancement of the card holders through the card holder track. The sprocket 461 may then be rotated counterclockwise in FIG. 23 to advance the tongue through one end of the slot 50 (FIGS. 27-29) in the cartridge holder at the card removal station thereby to push the TLD card out through the other end of the slot in the cartridge holder and along the card track 458 transversely to the read station 433. Suitable means in the form of plates such as the one seen at 464 are provided to close the top end of the card track thereby to contain the TLD card and the flexible tongue within the confines of the card track.

As mentioned above, the cartridge holder includes locking tongues 58 (FIGS. 27-29) for retaining the TLD card in the cartridge holder. To permit removal of the card from the holder, such locking tongues must be moved clear of the slot 50 in the TLD card holder. To accomplish this, a holder unlocking bar 465 is mounted to the support plate 365 for limited vertical movement above the card holder track 430 as seen in FIG. 23. The unlocking plate 465 extends transversely across the card holder track in the support plate and has depending unlocking pins 466 located such that they will align with the unlocking holes 60 of the cartridge holder positioned at the card removal station by the holder transport assembly. The unlocking plate is movable vertically upwardly by a pair of solenoids 467 to a position raising the locking pins above the path of the card holders through the card holder track thereby to permit advancement of the card holders by the holder transport assembly. When a card holder has been positioned at the card removal station, the solenoids 467 operate to push the unlocking plate 465 downwardly with the pins 466 passing through the unlocking holes 60 of the cartridge holder into engagement with the locking tongues 58. The pins are of sufficient length such that when the unlocking plate comes to rest against the top surface of the cartridge holder, the pins will have pushed the locking tongues of the cartridge holder clear of the cartridge holder slot 50 thereby to permit passage of the TLD card out of the cartridge holder as well as entry of the flexible tongue into the slot in the cartridge holder. The unlocking plate may be held in such unlocking position until the TLD card is returned to the cartridge holder by the card return transport assembly 358. At this time, the solenoids may be operated to raise the unlocking plate to clear the unlocking pins from the card holder.

The card return transport assembly 358 at the rear end of the support plate 356 is essentially identical to the card feed transport assembly 357 except that it is oppositely disposed. After the flexible tongue 460 of the card feed transport assembly 357 has positioned the TLD card at the read station 433, it may then be retracted to its initial position. After the TLD card has been read, the flexible tongue 469 of the card return transport assembly 358 may be forwardly advanced to push the TLD card forwardly and transversely back into the cartridge holder from which it was removed. The flexible tongue 469 thereafter may be retracted back to its initial position clearing the read station.

The PMT Assembly and the Hot Finger and Reference Light Assembly (Second Embodiment)

The PMT assembly 353 and the hot finger and reference light assembly 359 are respectively located above and below the support plate 356 at the read station 433 in opposition to each other. The PMT assembly 353 is essentially identical to the aforedescribed PMT assembly 73 of the card transport and reader mechanism 70 of FIGS. 1–18. The hot finger and reference light assembly 359 also is substantially similar to the hot finger and reference light assembly 83 of the FIGS. 1–18 mechanism except, as seen in FIG. 24, all of the reference lights 472 are carried by one shutter 473. The shutter 473 carrying the reference lights 472 is movable into alignment with the read station 433 by a control arm 474 which may be swung with respect to its pivot 475 by a rotary solenoid (not shown). As for the other shutter 476, such is independently shiftable into alignment with the read station 433 by another control arm 477 swung by another rotary solenoid around its pivot 478. The shutter 476 may be used to cover the hot fingers 479 to protect the same as when the TLD card reader is not being used. As also seen in FIG. 24, a pair of shutter-like seals 480 may be used to seal the card/tongue track 458 at opposite ends of the read station.

Operation of the TLD Card Reader of FIGS. 19–24

Respecting operation of the TLD card reader 350 and more particularly the operation of the above described component assemblies of the reader 350, the reader necessarily will also include suitable control circuitry for implementing operation of the component assemblies in the hereinafter discussed manner and sequence. As will be appreciated, the provision of such control circuitry is well within the skill of the art and accordingly no specific control circuitry is being included herein for the sake of brevity in the description of the subject invention.

Prior to automatic operation of the TLD card reader of FIGS. 19–24, cartridge holders 377 with TLD card containing holders stacked therein are loaded into the infeed carousel assembly 351 as above described. In the illustrated preferred embodiment, as many as 480 TLD card holders may be held in the infeed carousel assembly for automatic processing by the reader. Also prior to automatic reader operation, empty cartridge holders are loaded into the outfeed carousel assembly 352. After the carousel assemblies have been thusly loaded, automatic reader operation may be commenced.

If the infeed carousel assembly 351 has been loaded with a full complement of cartridge holders containing TLD card holders, one of such cartridge holders will then be located at the infeed station 396. If the infeed carousel assembly is not fully loaded with cartridge holders or with one or more empty cartridge holders, a TLD card holder might not initially be located at the infeed station. If a TLD card holder is not detected at the infeed station by the sensor 419, the infeed carousel assembly is operated to index the carousel rack 364 until the presence of a TLD card holder at the infeed station is detected.

When a TLD card holder is present at the infeed station 396, the holder transport assembly 355 is operated to transfer successively the TLD card holders out of the cartridge to the holder track 430 as above described to deliver a card holder to the card removal station 432. Although not shown, a card holder identification assembly may be provided between the infeed station 396 and card removal station 432 to read the card holder identification code as the card holder passes out of the cartridge holder and to the card removal station 432. The output of the card holder identification assembly may be sent to a storage device or computer for storage of the holder identification code along with the TL information thereafter obtained from the respective TLD card at the read station.

When a card holder is pushed to the card removal station 432 by the trailing card holders being advanced by the card holder transport assembly, the card holder transport assembly stops to permit removal of the TLD card from the card holder at the card removal station. At this point, the unlocking plate 465 is moved downwardly to open both ends of the slot through the card holder. Then the card feed transport assembly 357 is operated to advance the flexible tongue 460 thereof through the card holder at the card removal station thereby to push the TLD card out of the card holder and along the card track 458 to the read station 433. Between the card removal station and the read station a card identification assembly may be provided as seen at 484 in FIG. 23 to read the machine readable identification code on the TLD card. The output of the card identification assembly 483 also may be sent to the aforementioned storage device or computer for storage of the identification code along with the holder identification code.

When a TLD card is positioned at the read station 433, the hot finger and reference light assembly 359 and the PMT assembly 353 are operated in a manner similar to that described above in connection with the first described embodiment to heat the TL elements in the TLD card and measure the thermoluminescence of each TL element. The measured thermoluminescence may be used for computation of TL integrals and digitization of a glow curve in known manner and the resultant data may be sent to the external storage device or computer along with the card and holder identification codes.

After the TLD card has been read and the hot fingers 479 retracted clear of the path of the TLD card, the card return transport assembly 358 is operated to feed the flexible tongue 469 thereof along the card track 458. Before or during such operation of the card return transport assembly 358, the card feed transport assembly is or already has been operated to retract the flexible tongue 460 thereof to its original position clear of the card track 430. As the flexible tongue 469 is paid out of the card return transport assembly 358, the TLD card at the read station 433 will be pushed transversely along the card track 458 and back into its card holder located at the card removal station 432. After the TLD card is replaced in its holder, the flexible tongue 469 is retracted to clear the card holder track 430.

At this point, the card holder transport assembly is again operated to index a new TLD card holder to the card removal station 432 for removal, reading and return of the TLD card in such card holder in the aforedescribed manner.

When the card holder transport assembly is operated to index a new TLD card to the card removal station, the TLD card previously at the card removal station will be advanced longitudinally along the card holder slot 356 and ultimately to the outfeed station 398. At the outfeed station, the card holder will pass edgewise through the bottom slot in the cartridge holder located at the outfeed station by the outfeed carousel assembly 352. Also, the bottommost card holder then in the cartridge holder at the outfeed station will be elevated by the outfeed cams 436 and 437 to allow passage of the card holder therebeneath.

The aforedescribed sequence is repeated successively to remove TLD card holders from the cartridge holder at the infeed station 396 for transfer to the card removal station 432 and then to the outfeed station 398 for stacking in the cartridge holder at the outfeed station. Of course, such indexing of the TLD card holders is stopped each time a card holder is located at the card removal station 432 to allow for removal, reading and return of its TLD card. When the cartridge holder at the infeed station is emptied of TLD card holders, the infeed carousel assembly 351 is operated to index the carousel rack 364 thereof to present another cartridge holder at the infeed station for successive removal of TLD card holders therefrom by the card holder transport assembly 355. The outfeed carousel assembly 352 also will be indexed when the cartridge holder at the outfeed station 398 is filled with TLD card holders as detected by an appropriate sensor to locate an empty cartridge holder at the outfeed station. When the infeed carousel assembly has been completely emptied of TLD cards, automatic operation of the TLD card reader will cease. The last few TLD card holders removed from the infeed carousel assembly may be dummy card holders so that all TLD cards intended to be read have been advanced at least to the card removal station and preferably to the outfeed station before the TLD card reader ceases operation.

Although the invention has been shown and described with respect to preferred embodiments, it is obvious that equivalent alterations and modifications will occur to others skilled in the art upon the reading and understanding of this specification. The present invention includes all such equivalent alterations and modifications, and is limited only by the scope of the following claims.

We claim:

1. In a TLD card reader having a TLD card infeed station, a TLD card read station and a TLD card outfeed station, first holder means for holding a plurality of TLD cards in vertically stacked relationship at said infeed station, second holder means for holding a plurality of TLD cards in vertically stacked relationship at said outfeed station, and TLD card transport means for sequentially transferring the TLD cards from the bottom of said first holder means to said read station and then to said second holder means, said transport means including a shuttle having slot means at its top side for receiving a TLD card, and drive means for horizontally shifting said shuttle first to position said slot means at said infeed station, then at said read station and then at said outfeed station, said shuttle including means for raising a bottommost card in said second holder means to a height above a TLD card received in said shuttle slot means whereby the latter card may be moved by said shuttle beneath the former card for stacking in said second holder means.

2. A TLD card reader as set forth in claim 1, wherein said first holder means includes a bottom slot through which a bottommost TLD card may pass edgewise out of said first holder means when received in said shuttle slot means.

3. A TLD card reader as set forth in claim 1, wherein said second holder means includes a bottom slot through which a TLD card received in said shuttle slot means may pass edgewise into said second holder means.

4. A TLD card reader as set forth in claim 3, wherein said first and second holder means are identical but oppositely disposed.

5. A TLD card reader as set forth in claim 3, further comprising means for vertically lifting said second holder means to lift the bottommost card therein out of said shuttle slot means.

6. A TLD card reader as set forth in claim 1, further comprising a support including a track in which said shuttle is shifted longitudinally.

7. A TLD card reader as set forth in claim 6, wherein said shuttle includes a rack and said drive means a pinion in driving engagement with said rack.

8. A TLD card reader as set forth in claim 7, wherein said shuttle further includes a pair of plates mounted atop said rack with relatively adjacent transverse edges longitudinally spaced to form said slot means.

9. A TLD card reader as set forth in claim 1, further comprising an infeed carousel for holding a plurality of said first holder means and means for indexing said carousel sequentially to locate said plural first holder means at said infeed station.

10. A TLD card reader as set forth in claim 10, further comprising an outfeed carousel for holding a plurality of second holder means and means for indexing said outfeed carousel sequentially to locate said plural second holder means at said outfeed station.

11. A TLD card reader as set forth in claim 11, wherein each carousel includes a carousel rack for holding vertically a plurality of the holder means in a circumferentially spaced apart arrangement while permitting vertical movement of such holder means in said rack, said rack being rotatably indexable by said means for indexing sequentially to locate the holder means at the infeed (outfeed) station, annular support means for vertically supporting the holder means at elevated positions in said cartridge rack, said annular support means terminating adjacent said infeed (outfeed) station to permit lowering of a holder means at the infeed (outfeed) station, and cam means for raising a holder means at the infeed (outfeed) station to an elevated position prior to indexing rotation of said rack for transfer onto said annular support means during indexing rotation of said rack.

12. A TLD card reader as set forth in claim 1, wherein said shuttle transfers a TLD card edgewise along a narrow planar path to and from said read station, and further comprising heater means at said read station at one side of said path for heating a TL element in a TLD card positioned at said read station by said shuttle, sensor means at the other side of said path in opposition to said heater means for sensing light emitted by said TL element when heated by said heater means, shutter means movable into the plane of said path from a first position transversely offset from said path to a second position between said heater means and said sensor means, and reference light means carried by said shutter means for effecting calibration, testing or the like of said sensor means when said shutter means is located at said second position.

13. A TLD card reader as set forth in claim 1, further comprising enclosure means for enclosing said read station, said enclosure means including wall means defining a slot through which said shuttle passes, said shuttle having a top surface closely adjacent the top of said slot, and a light seal extending in a direction transverse to said shuttle and constrained in said wall means to ride on the top surface of said shuttle, said light seal having a star-shaped cross-section with each radiating spine extending transversely the width of said shuttle top surface, and said shuttle top surface having formed therein a transverse slot for recieving a spine of said light seal when positioned to locate a TLD card at the read station.

14. A TLD card reader as set forth in claim 1, further comprising plural hot fingers, means for mounting said hot fingers for extension and retraction at said read station, means for yieldingly urging each hot fingers to an extended position independently of the other hot fingers, and means for commonly retracting said hot fingers from their respective extended positions.

15. In a TLD card reader for TLD cards normally housed in a card holder, first holder means for holding a vertical stack of card holders with the TLD cards at a card holder infeed station, second holder means for holding a vertical stack of card holders with TLD cards at a card holder outfeed station, card holder transport means for successively transferring card holders from said first holder means to a card removal station and then to said second holder means along a card holder track extending longitudinally between said infeed and outfeed stations, and TLD card transport means for transferring the TLD card of each card holder successively presented to the card removal station to a TLD card read station at one side of said card holder path and then back to said card removal station for replacement in the card holder, said card holder transport means including means at said infeed station for pushing a card holder edgewise out of said first holder means and into said holder track for guided passage therealong and means for raising a bottommost card in said second holder means to permit passage therethrough of a card holder passing from said card holder track.

16. A TLD card reader as set forth in claim 15 comprising a card track extending transversely to said holder track and between said card removal and read stations.

17. A TLD card reader as set forth in claim 16, wherein said card transport means includes first flexible tongue means for pushing the card out of a card holder at said card removal station along said card track to said read station and second flexible tongue means for pushing a card from said read station along said card track for replacement in a card holder at said card removal station.

18. A TLD card reader as set forth in claim 15, further comprising an infeed carousel for holding a plurality of said first holder means and means for indexing said carousel sequentially to locate said plural first holder means at said infeed station.

19. A TLD card reader as set forth in claim 18, further comprising an outfeed carousel for holding a plurality of said second holder means and means for indexing said outfeed carousel sequentially to locate said plural second holder means at said outfeed station.

20. A carousel assembly comprising a carousel rack for holding vertically a plurality of cartridge holders in a circumferentially spaced apart arrangement while permitting vertical movement of such holders in said rack, indexing means for rotatably indexing said rack sequentially to locate the cartridge holders at a transfer station, annular support means for vertically supporting the cartridge holders at elevated positions in said cartridge rack, said annular support means terminating adjacent said transfer station to permit lowering of a cartridge holder at the transfer station, and cam means for raising a cartridge holder at the transfer station to an elevated position prior to indexing rotation of said rack for transfer onto said annular support means during indexing rotation of said rack.

21. A carousel assembly as set forth in claim 20, wherein said indexing means includes a Geneva mechanism, said Geneva mechanism including a driven wheel fixed in relation to said rack and a driver wheel for rotating said driven wheel through a predetermined arcuate interval upon 360° rotation of said driver wheel.

22. A carousel assembly as set forth in claim 21, wherein said cam means is a barrel cam having transition surfaces extending between diametrically opposed upper and lower surfaces.

23. A carousel assembly as set forth in claim 22, including means for simultaneously rotating said driver wheel and barrel cam.

24. A carousel assembly as set forth in claim 23, wherein said transition surface are operative to raise and lower a cartridge holder at the transfer station during the dwell period of the Geneva mechanism and said upper surface is operative to hold the cartridge holder at the transfer station at an elevated position during the rotation period of said Geneva mechanism.

25. A carousel assembly as set forth in claim 20, in combination with at least one cartridge holder, said cartridge holder including roller means for riding atop said annular support means and cam means.

26. In a TLD card reader, TLD card transport means for transferring a TLD card edgewise along a narrow planar path to and from a read station in said reader, heater means at said read station at one side of said path for heating a TL element in a TLD card positioned at said read station by said transport means, sensor means at the other side of said path in opposition to said heater means for sensing light emitted by said TL element when heated by said heater means, shutter means movable into the plane of said path from a first position transversely offset from said path to a second position between said heater means and said sensor means, and reference light means carried by said shutter means for effecting calibration, testing or the like of said sensor means when said shutter means is located at said second position.

27. In a TLD card reader having a TLD card read station, an elongated shuttle movable longitudinally to transfer a TLD card to and from said read station, enclosure means for enclosing said read station, said enclosure means including wall means defining a slot through which said shuttle passes, said shuttle having a top surface closely adjacent the top of said slot, and a light seal extending in a direction transverse to said shuttle and constrained in said wall means to ride on the top surface of said shuttle, said light seal having a star-shape cross-section with each radiating spine extending transvesely the width of said shuttle top surface, and said shuttle top surface having formed therein a transverse slot for receiving a spine of said light seal when positioned to locate a TLD card at the read station.

28. A hot finger assembly for a TLD card reader comprising plural hot fingers, means for mounting said hot fingers for extension and retraction, means for yieldingly urging each hot fingers to an extended position independently of the other hot fingers, and means for commonly retracting said hot fingers from their respective extended positions.

29. A hot finger assembly for a TLD card reader comprising a support plate having a transverse axis and a longitudinal axis, four hot fingers, and respective means for mounting said hot fingers to said support in close proximity at respective quadrants defined by said axes of said support, each said means for mounting including means for adjusting the respective hot finger independently of the other hot fingers both longitudinally and transversely with respect to said support.

30. In a TLD card reader having a TLD card infeed station, a TLD card read station and a TLD card outfeed station, first and second holder means for holding respective pluralities of TLD cards in vertically stacked relationship, first receiver means for removably receiving and positioning said first holder means at said infeed station, second receiver means for removably receiving and positioning said second holder means at said outfeed station, and TLD card transport means for sequentially transferring the TLD cards from the bottom of said first holder means to said read station and then to said second holder means, said transport means including a shuttle having slot means for receiving a TLD card, and drive means for horizontally shifting sid shuttle along a movement path first to position said slot means at said infeed station, then at said read station and then at said outfeed station, and said first holder means including at the lower end thereof laterally spaced apart feet which straddle the movement path of ssid shuttle at said infeed station and form a bottom support for a stack of TLD cards held in said first holder means.

31. A TLD card reader as set forth in claim 30, wherein said feet define the lower edge of a slot in said first holder means through which a bottommost TLD card may pass edgewise out of said first holder means when received in said shuttle slot means.

* * * * *